(12) United States Patent
Katagiyama et al.

(10) Patent No.: US 10,018,793 B2
(45) Date of Patent: Jul. 10, 2018

(54) CONNECTOR

(71) Applicant: JAPAN AVIATION ELECTRONICS INDUSTRY, LIMITED, Shibuya-ku, Tokyo (JP)

(72) Inventors: Naoki Katagiyama, Tokyo (JP); Masaki Ishiguro, Tokyo (JP); Takayuki Tanaka, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/793,699

(22) Filed: Oct. 25, 2017

(65) Prior Publication Data

US 2018/0156995 A1     Jun. 7, 2018

(30) Foreign Application Priority Data

Dec. 6, 2016  (JP) .................................. 2016-236500

(51) Int. Cl.
   *G02B 6/36*     (2006.01)
   *G02B 6/42*     (2006.01)

(52) U.S. Cl.
   CPC ......... *G02B 6/4261* (2013.01); *G02B 6/4277* (2013.01)

(58) Field of Classification Search
   CPC .......................... G02B 6/4261; G02B 6/4277
   USPC ....................................................... 385/92
   See application file for complete search history.

(56) References Cited

U.S. PATENT DOCUMENTS

| 7,758,381 B2 | 7/2010 | Oki |
| 8,427,842 B2 | 4/2013 | Hakomori |
| 8,714,840 B2 | 5/2014 | Matsue et al. |
| 9,618,701 B2 | 4/2017 | Mooij et al. |
| 2004/0197055 A1* | 10/2004 | Fischer ................ G02B 6/3869 385/92 |
| 2007/0041687 A1* | 2/2007 | Mizue .................. G02B 6/4277 385/92 |
| 2009/0269077 A1* | 10/2009 | Sone ...................... H04B 10/40 398/135 |

FOREIGN PATENT DOCUMENTS

| CN | 201974546 U | 9/2011 |
| JP | 2009164338 A | 7/2009 |
| JP | 5083459 B2 | 11/2012 |
| JP | 2013029639 A | 2/2013 |
| JP | 2013029640 A | 2/2013 |
| JP | 5869274 B2 | 2/2016 |
| JP | 2016029654 A | 3/2016 |
| JP | 2016122050 A | 7/2016 |

* cited by examiner

*Primary Examiner* — Jerry Blevins
(74) *Attorney, Agent, or Firm* — Holtz, Holtz & Volek PC

(57) ABSTRACT

A connector is mateable with and removable from a mating connector, which has an optical connector, along a mating direction. The connector is provided with a receptacle to be attached to a case and an adapter to be mounted on a circuit board located in the case. The adapter has an inner module to be connected to the optical connector and a cage which accommodates the inner module at least in part. One of the receptacle and the cage is provided with a contact portion which is in contact with a remaining one of the receptacle and the cage. The receptacle and the cage are electrically connected to each other through the contact portion without direct fixation between the receptacle and the cage.

8 Claims, 24 Drawing Sheets

CONNECTOR

CROSS REFERENCE TO RELATED APPLICATIONS

This application is based on and claims priority under 35 U.S.C. § 119 to Japanese Patent Application No. JP2016-236500 filed Dec. 6, 2016, the contents of which are incorporated herein in their entirety by reference.

BACKGROUND OF THE INVENTION

This invention relates to a connector, in particular, to a connector which is provided with a receptacle to be attached to a case and an adapter to be mounted on a circuit board located in the case.

Referring to FIG. 41, a connector 900 described in Patent Document 1 (JPA 2009-164338) includes a cage 920 provided on a circuit board 910 of a host device (not shown) and a module 930 which is inserted into the cage 920. A front-end part of the cage 920 is inserted into an opening 942 of a front panel 940 of the host device. The module 930 is inserted into the cage 920 so that a receptacle 950 thereof protrudes outside the front panel 940. The cage 920 has a plurality of cage fingers 922 in the front-end part thereof. The cage 920 is electrically connected to the front panel 940 with the cage fingers 922. Accordingly, the cage 920 and a case of the host device are electrically connected to each other so as to prevent a noise generated in the module 930 from leaking outside the case.

Referring to FIG. 42, a mating enclosure assembly 970 described in Patent Document 2 (JPA 2016-29654) has an extension portion 972. Since the mating enclosure assembly 970 has the extension portion 972, a position of a cage (not shown) including a transceiver can be set behind a wall of an electronic device (not shown).

SUMMARY OF THE INVENTION

In the connector 900 of Patent Document 1, the front panel 940 of the host device is attached to the cage 920 directly. Moreover, the receptacle 950 is formed as a part of the module 930. Therefore, the connector 900 of Patent Document 1 has a problem of low degree of freedom about attaching it to the case.

The mating enclosure assembly 970 of Patent Document 2 has another problem that the extension portion has a relatively large size. Furthermore, in Patent Document 2, the enclosure assembly 970 and the case are unclear about an interrelationship therebetween. Accordingly, Patent Document 2 does not disclose measures to electromagnetic interference (EMI).

It is an object of the present invention to provide a connector which can increase degree of freedom about attaching it to a case without enlargement and which can reduce a noise leaking from the inside to the outside of the case.

One aspect of the present invention provides a connector which is mateable with and removable from a mating connector along a mating direction. The mating connector has an optical connector. The connector comprises a receptacle to be attached to a case and an adapter to be mounted on a circuit board located in the case. The adapter has an inner module to be connected to the optical connector and a cage which accommodates the inner module at least in part. One of the receptacle and the cage is provided with a contact portion which is in contact with a remaining one of the receptacle and the cage. The receptacle and the cage are electrically connected to each other through the contact portion without direct fixation between the receptacle and the cage.

The connector is provided with the receptacle to be attached to the case and the adapter to be mounted on the circuit board located in the case. Accordingly, the connector has improved degree of freedom about attaching it to the case. Moreover, one of the receptacle and the cage of the adapter is provided with the contact portion which is in contact with the remaining one of the receptacle and the cage. Accordingly, the receptacle and the cage are electrically connected to each other without direct fixation between them, and they suppress radiating a noise together with the case.

An appreciation of the objectives of the present invention and a more complete understanding of its structure may be had by studying the following description of the preferred embodiment and by referring to the accompanying drawings.

Figure 1:
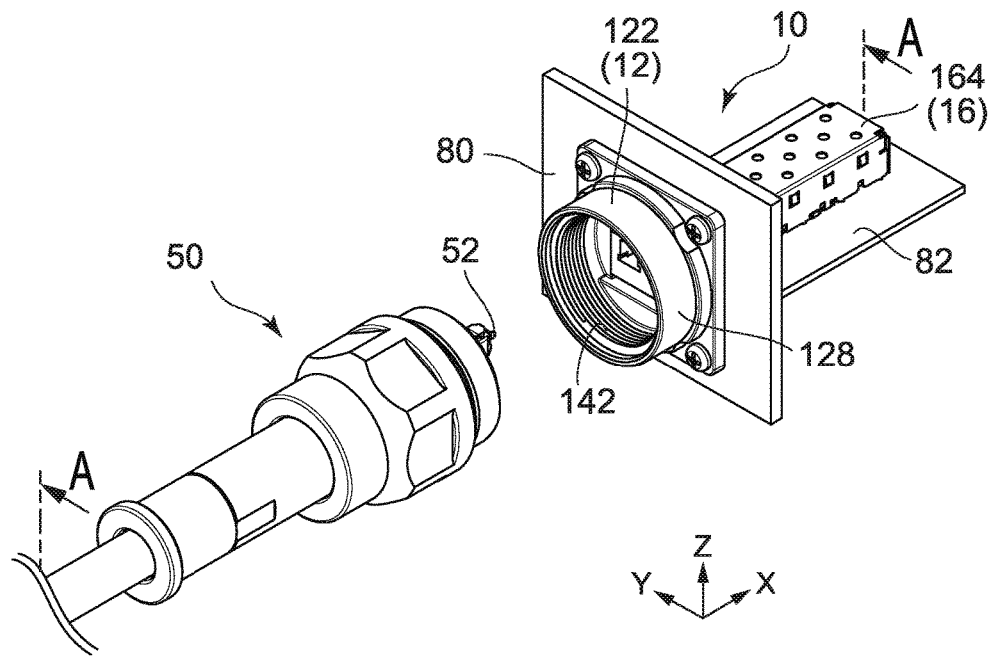
FIG. 1 is a perspective view showing a connector assembly including a connector according to a first embodiment of the present invention. The connector and a mating connector are not yet mated with each other. A receptacle of the connector is attached to a case while an adapter of the connector is mounted on a circuit board. The case is depicted in part.
Figure 2:
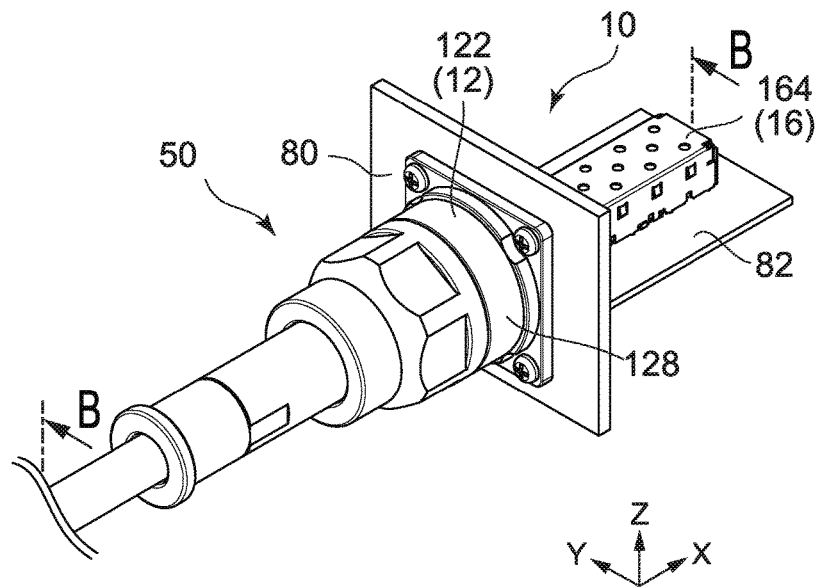
FIG. 2 is another perspective view showing the connector assembly of FIG. 1. The connector and the mating connector are in a mated state.
Figure 3:
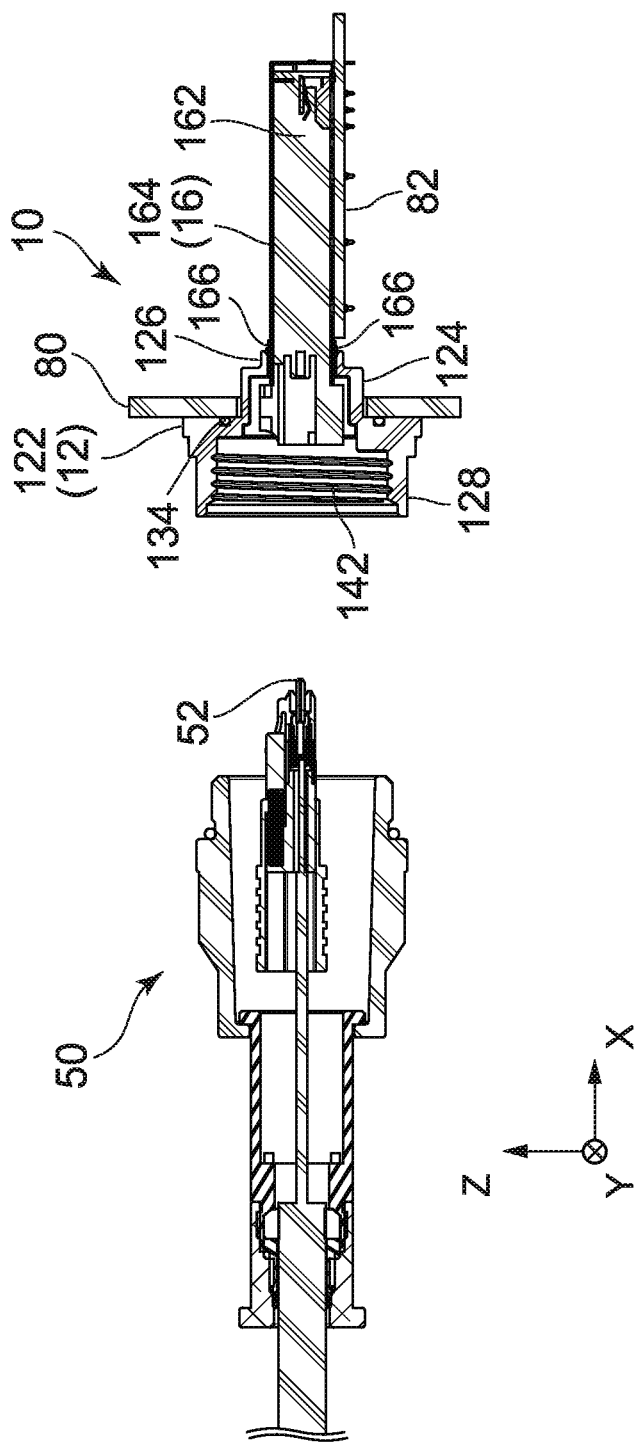
FIG. 3 is a cross-sectional view showing the connector assembly of FIG. 1, taken along line A-A. An inner module of the adapter included in the connector is not depicted in detail.
Figure 4:
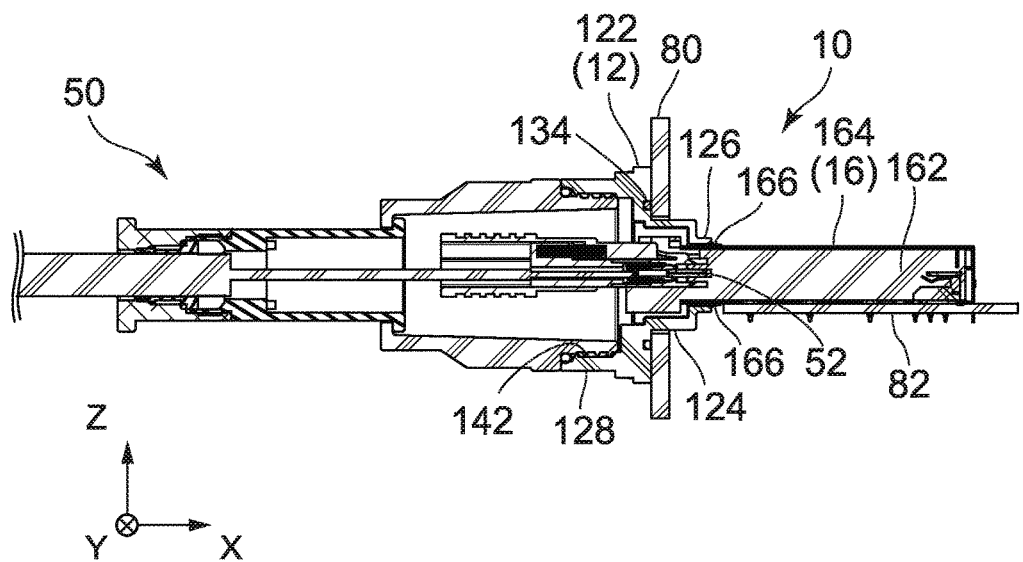
FIG. 4 is a cross-sectional view showing the connector assembly of FIG. 2, taken along line B-B. The inner module of the adapter included in the connector is not depicted in detail.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

As understood from FIGS. 1 to 4, a connector 10 according to a first embodiment of the present invention is a receptacle connector which is mateable with and removable from a mating connector 50, i.e. a plug connector, along a mating direction. The connector 10 forms a connector assembly together with the mating connector 50. It should be noted that the mating direction is an X-direction in the present embodiment.

As shown in FIGS. 5 to 9, the connector 10 is provided with a receptacle 12 and an adapter 16. The receptacle 12 is attached to a case 80 of a device (not shown) from the outside or a negative X-direction of the case 80. A part of the receptacle 12 is inserted into a hole 802 formed in the case 80 and protrudes inside the case 80 or in a positive X-direction. The adapter 16 is mounted on a circuit board 82 located in the case 80. A part of the adapter 16 is positioned inside the receptacle 12. The receptacle 12 and the circuit board 82 are indirectly fixed to each other through the case 80 and another member (not shown) of the device (not shown). On the other hand, the receptacle 12 and the adapter 16 are not fixed directly to each other. The case 80 is made of metal and electrically grounded preferably.

As shown in FIGS. 10 to 14, the receptacle 12 has a flange portion 122, a first-rectangular-tubular portion (a first tubular portion) 124, a second-rectangular-tubular portion (a second tubular portion) 126 and a cylindrical portion 128. The receptacle 12 is made of metal. The receptacle 12 is electrically connected to the case 80 when attached to the case 80 (see FIG. 8). As shown in FIGS. 10 to 13, the flange portion 122 is a plate portion of a rectangular shape. The flange portion 122 is formed, at four corner portions thereof, with screw holes 130 penetrating the flange portion 122 in a front-rear direction. As understood from FIGS. 11, 13 and 14, the flange portion 122 is formed, in a rear surface thereof, with a groove 132 so that a periphery of the first-rectangular-tubular portion 124 is encircled. In the groove 132, a waterproof member 134 is fit. It should be noted that the front-rear direction corresponds to the mating direction in the present embodiment. The positive X-direction is directed forward while the negative X-direction directed rearward.

Figure 10:
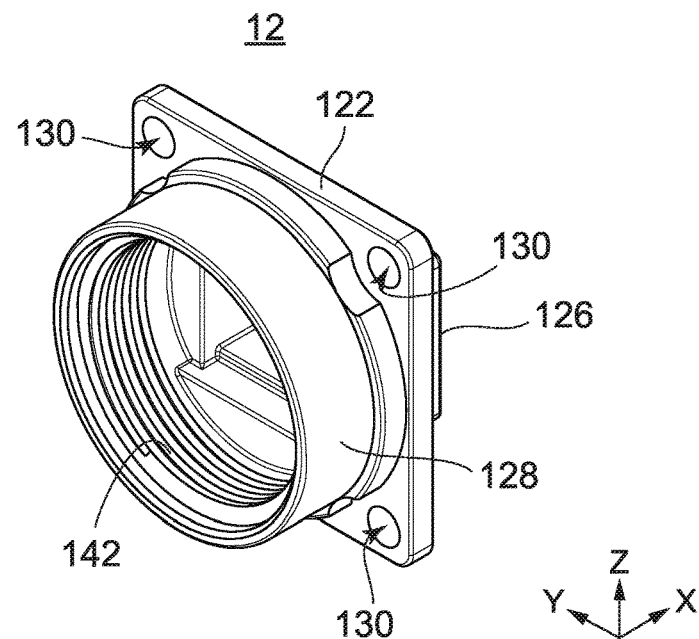
FIG. 10 is a perspective view showing the receptacle included in the connector of FIG. 5.
Figure 11:
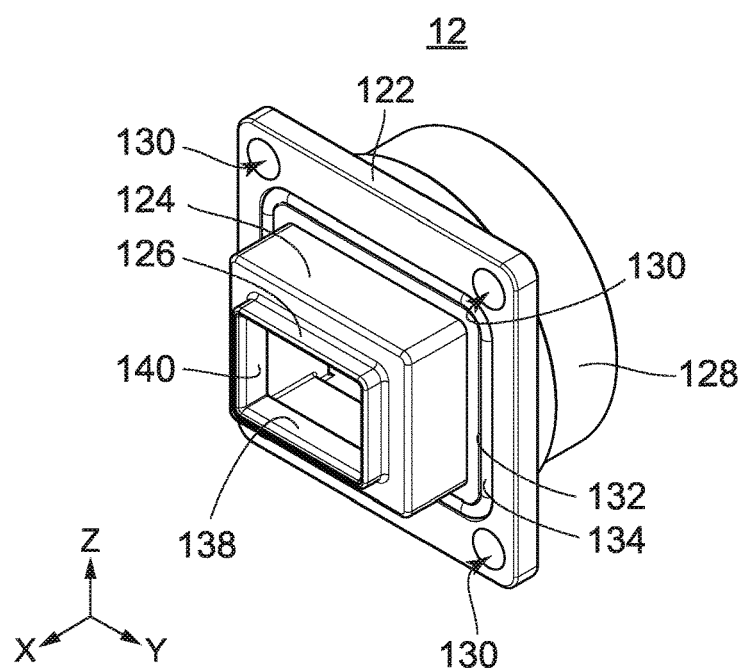
FIG. 11 is another perspective view showing the receptacle of FIG. 10.
Figure 14:
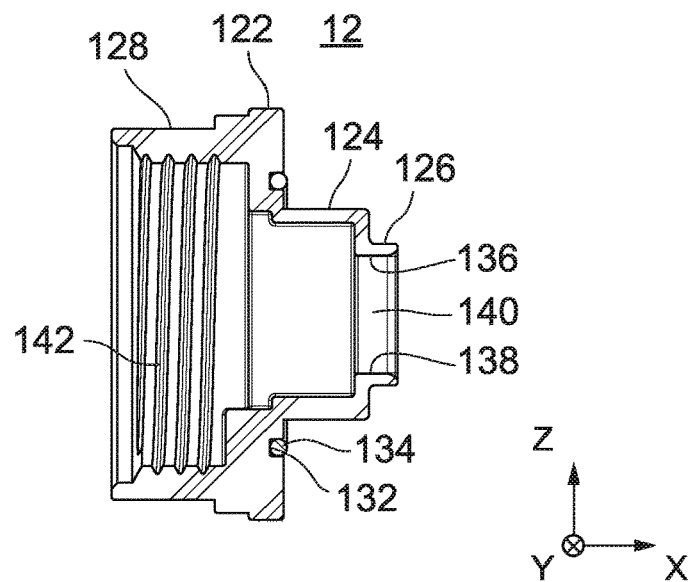
FIG. 14 is a cross-sectional view showing the receptacle of FIG. 12, taken along line D-D.
Figure 15:
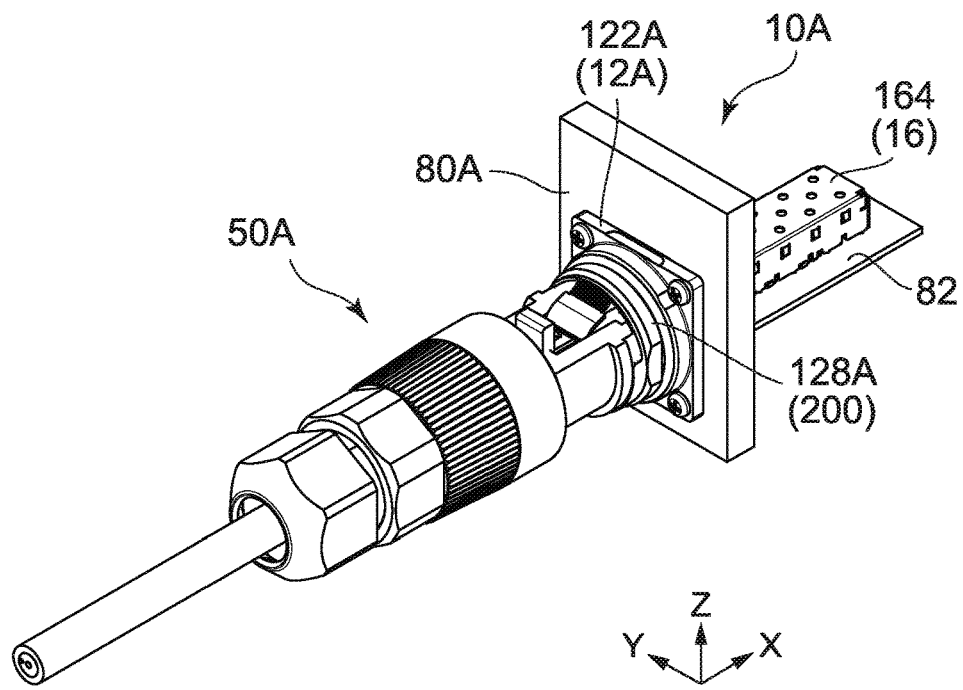
FIG. 15 is a perspective view showing a connector assembly including a connector according to a second embodiment of the present invention. The connector and a mating connector are in a mated state while a coupling nut of the mating connector is positioned away from a receptacle of the connector. The receptacle of the connector is attached to a case while an adapter of the connector is mounted on a circuit board. The case is depicted in part.
Figure 16:
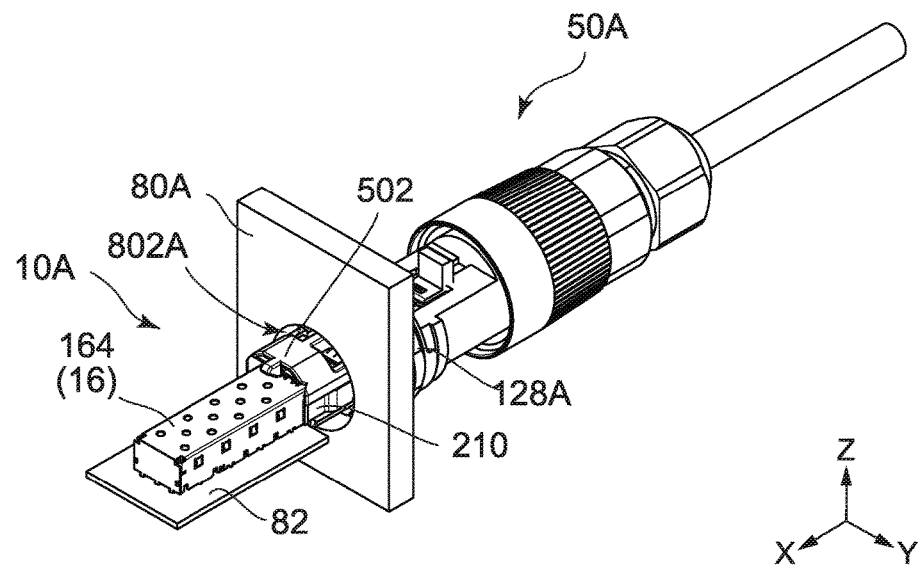
FIG. 16 is another perspective view showing the connector assembly of FIG. 15.
Figure 17:
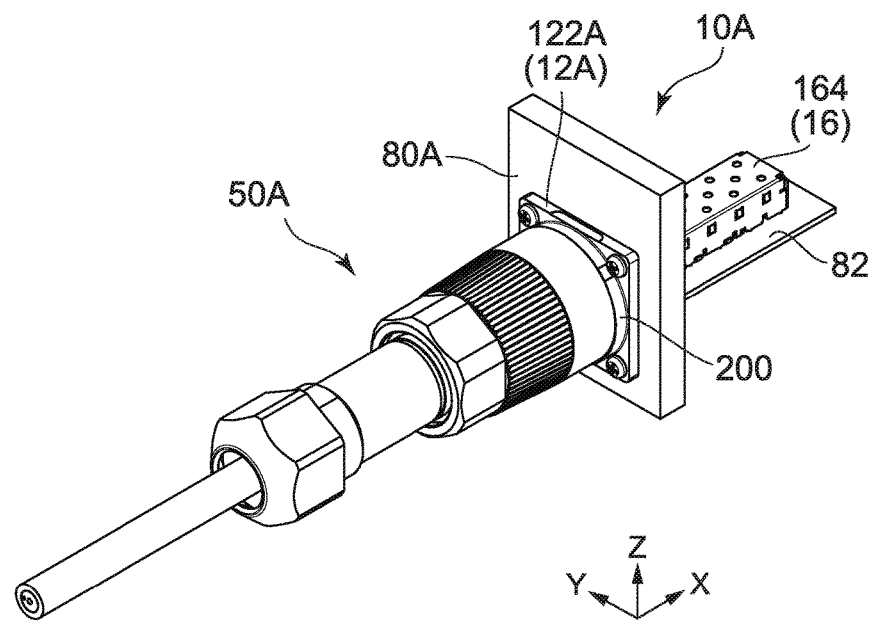
FIG. 17 is still another perspective view showing the connector assembly of FIG. 15. The coupling nut is fixed to the receptacle.
Figure 18:
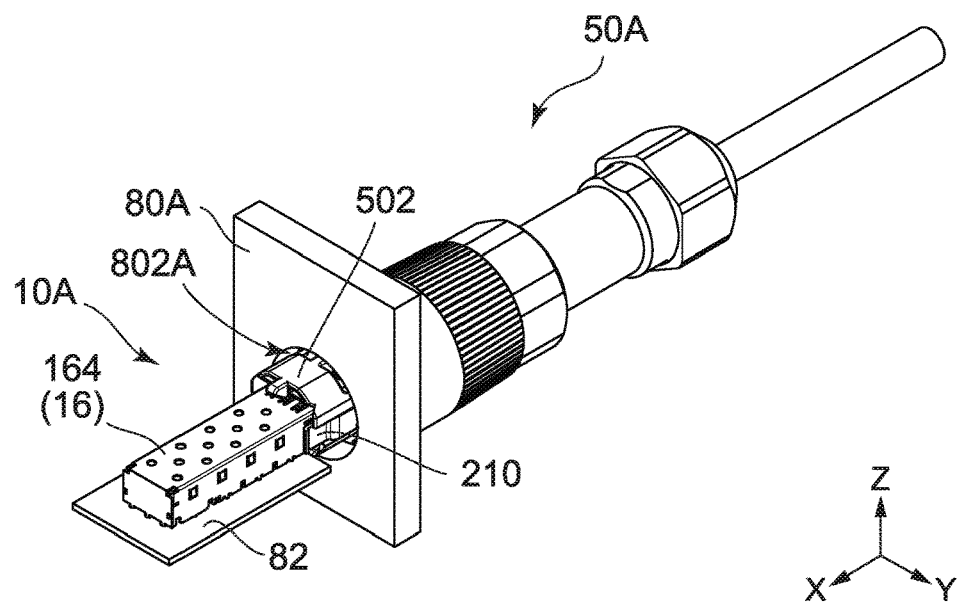
FIG. 18 is another perspective view showing the connector assembly of FIG. 17.
Figure 19:
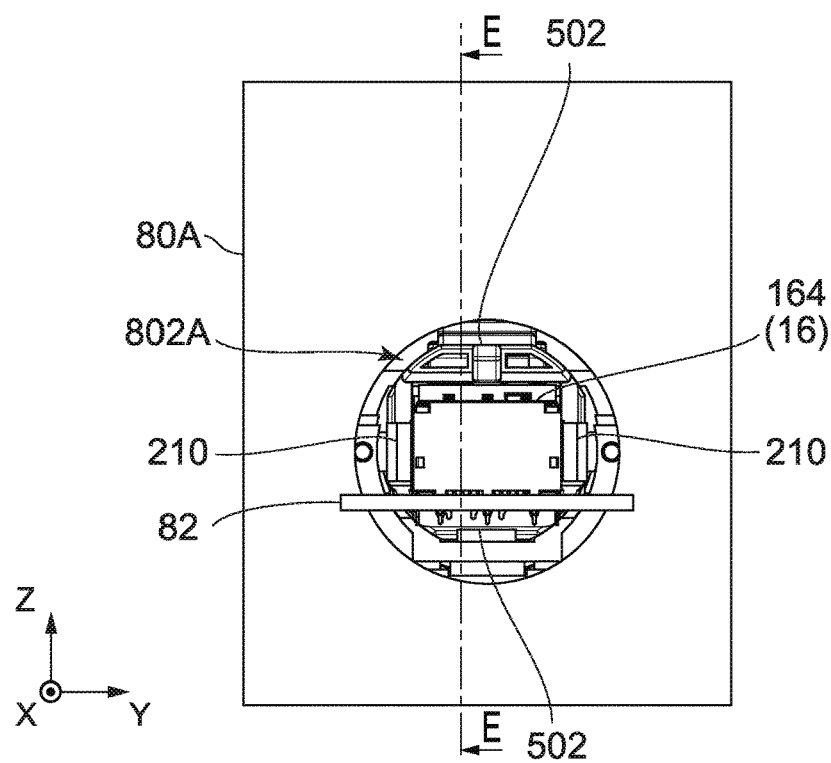
FIG. 19 is a rear view showing the connector assembly of FIG. 18.
Figure 20:
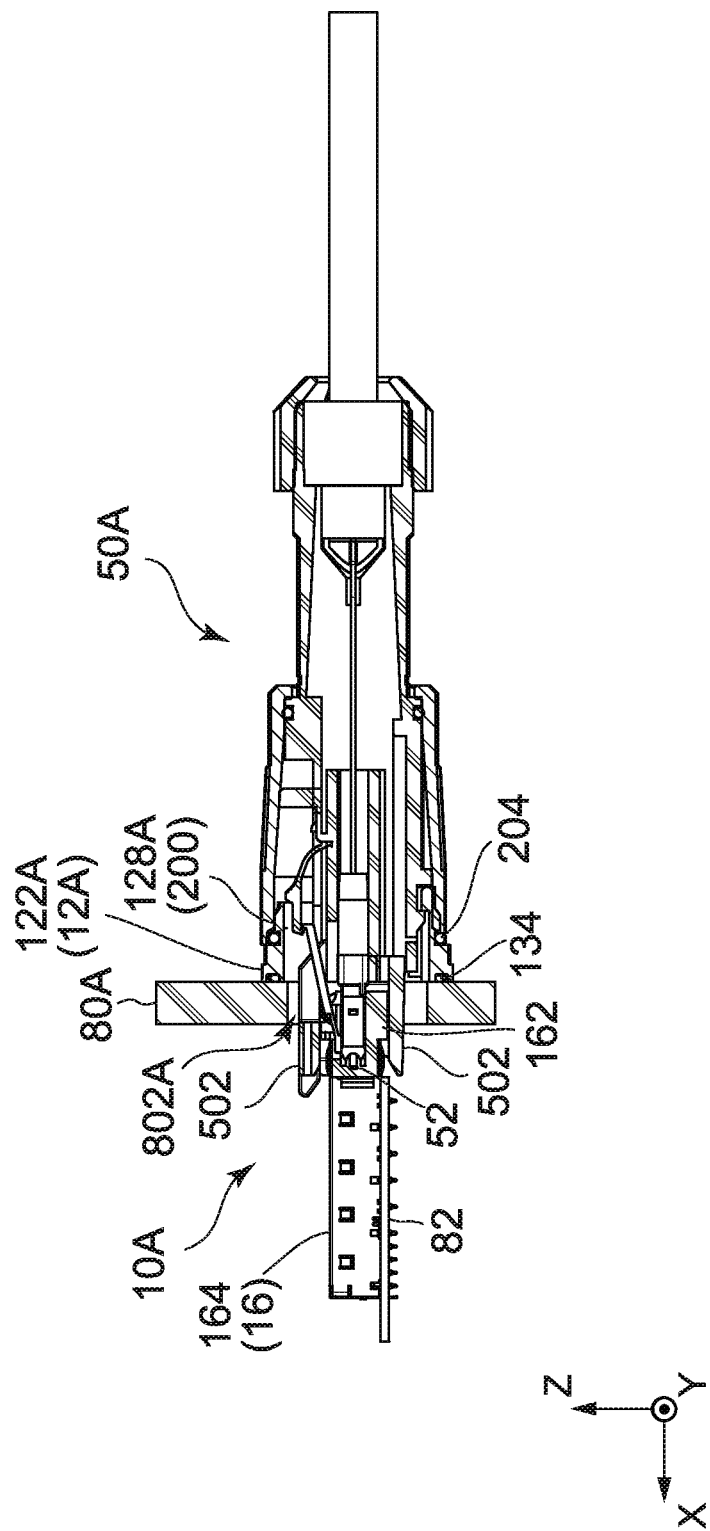
FIG. 20 is a cross-sectional view showing the connector assembly of FIG. 19, taken along line E-E.

As shown in FIGS. 11 and 14, the first-rectangular-tubular portion 124 protrudes rearward from the flange portion 122 in the front-rear direction. The second-rectangular-tubular portion 126 protrudes further rearward from the first-rectangular-tubular portion 124. As understood from FIGS. 6 and 8, when the receptacle 12 is attached to the case 80, the first-rectangular-tubular portion 124 extends inward of the case 80 or in the positive X-direction from the flange portion 122 along the mating direction. Then, the second-rectangular-tubular portion 126 extends further inward of the case 80 or in the positive X-direction from the first-rectangular-tubular portion 124. On the other hand, as shown in FIGS. 10, 11 and 14, the cylindrical portion 128 protrudes forward from the flange portion 122. As understood from FIGS. 5 and 8, when the receptacle 12 is attached to the case 80, the cylindrical portion 128 extends outside the case 80 or in the negative X-direction from the flange portion 122 along the mating direction.

Figure 12:
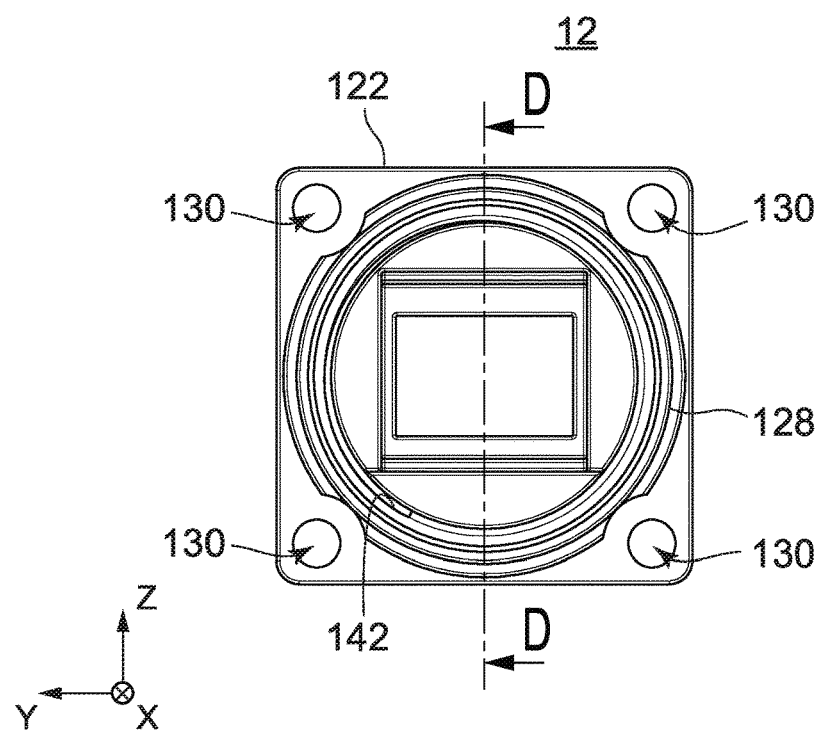
FIG. 12 is a front view showing the receptacle of FIG. 10.
Figure 13:
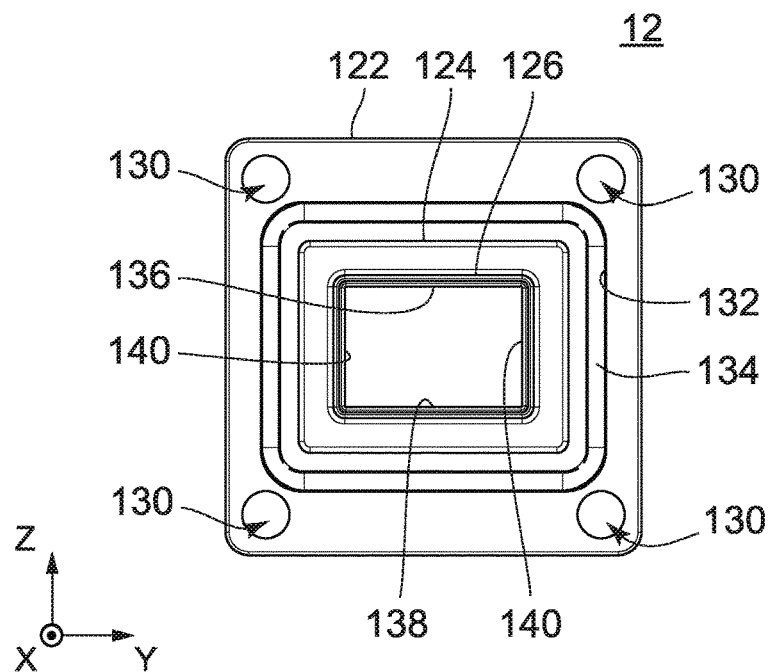
FIG. 13 is a rear view showing the receptacle of FIG. 10.

Referring to FIGS. 11 to 14, the first-rectangular-tubular portion 124 has a first outer shape and a first inner shape while the second-rectangular-tubular portion 126 has a second outer shape and a second inner shape. As understood from FIGS. 11 to 14, when seen along the mating direction, the first outer shape, the first inner shape, the second outer shape and the second inner shape are approximately rectangular. In detail, these shapes are rounded rectangles. However, the present invention is not limited thereto. Provided that the second inner shape of the second-rectangular-tubular portion 126 corresponds to an outer shape of the adapter 16 (see FIG. 6), the first and the second outer shapes and the first and the second inner shapes may be polygons, ellipses or circles. When seen along the mating direction, the second outer shape and the second inner shape of the second-rectangular-tubular portion 126 are smaller than the first outer shape and the first inner shape of the first-rectangular-tubular portion 124, respectively. Moreover, as shown in FIG. 12, the first inner shape of the first-rectangular-tubular portion 124 is smaller than a third inner shape of the cylindrical portion 128. When seen along the mating direction, the first inner shape of the first-rectangular-tubular portion 124 is approximately inscribed in the third inner shape of the cylindrical portion 128. In the present embodiment, the first inner shape of the first-rectangular-tubular portion 124 is smaller than the third inner shape of the cylindrical portion 128. Accordingly, it is possible to avoid enlarging the first-rectangular-tubular portion 124 and to make the groove 132 and the waterproof member 134 smaller. As a result, it is possible to avoid enlarging the receptacle 12.

As understood from FIGS. 10 to 14, the second-rectangular-tubular portion 126 has, as its inner surface, two sets each of which has two flat surfaces facing each other. In detail, the inner surface of the second-rectangular-tubular portion 126 has an upper surface 136, a lower surface 138 and a pair of side surfaces 140. The upper surface 136 and the lower surface 138 face each other in an up-down direction. The side surfaces 140 face each other in a lateral direction. On the other hand, as shown in FIGS. 10 and 14, the cylindrical portion 128 has an inner circumference surface in which a female screw 142 is formed. It should be noted that, in the present embodiment, the up-down direction is a Z-direction while the lateral direction is a Y-direction.

Figure 8:
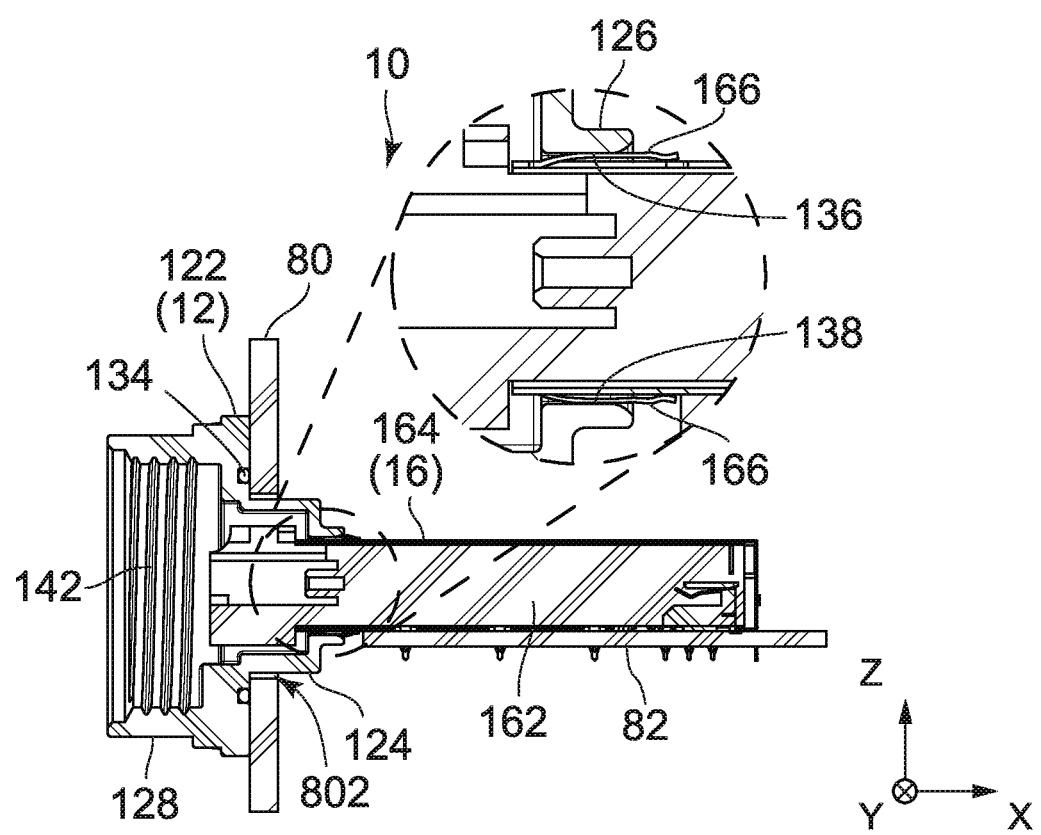
FIG. 8 is a cross-sectional view showing the connector of FIG. 7, taken along line C-C. A part of the connector is enlarged to be depicted. The inner module of the adapter included in the connector is not depicted in detail.

As shown in FIG. 8, the adapter 16 has an inner module 162 and a cage 164. The cage 164 is located inside the case 80 or in the positive X-direction of the case 80. The inner module 162 is located, except for a part thereof, inside the case 80 or in the positive X-direction of the case 80. In other words, the part of the inner module 162 is located outside the case 80 or in the negative X-direction of the case 80. The inner module 162 is connected to an optical connector 52 (see FIGS. 3 and 4) included in the mating connector 50 (see FIGS. 3 and 4) when the connector 10 is mated with the mating connector 50. The inner module 162 may be a small form-factor pluggable (SFP) module or a relay module, for example. The cage 164 has a rectangular tubular shape. The cage 164 is formed by cutting out a thin metal sheet and bending the cut out metal sheet. The cage 164 is fixed to the circuit board 82 to detachably accommodate the inner module 162 at least in part. In other words, the cage 164 covers an outer surface of the inner module 162 at least in part. Accordingly, the cage 164 shields a noise radiated from the inner module 162.

Figure 6:
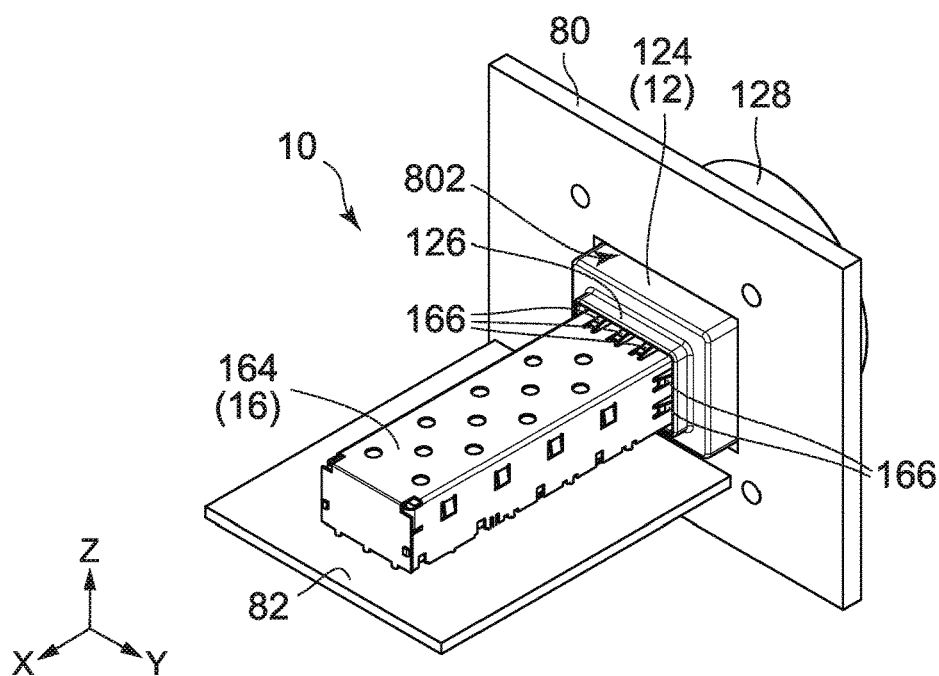
FIG. 6 is another perspective view showing the connector of FIG. 5.
Figure 9:
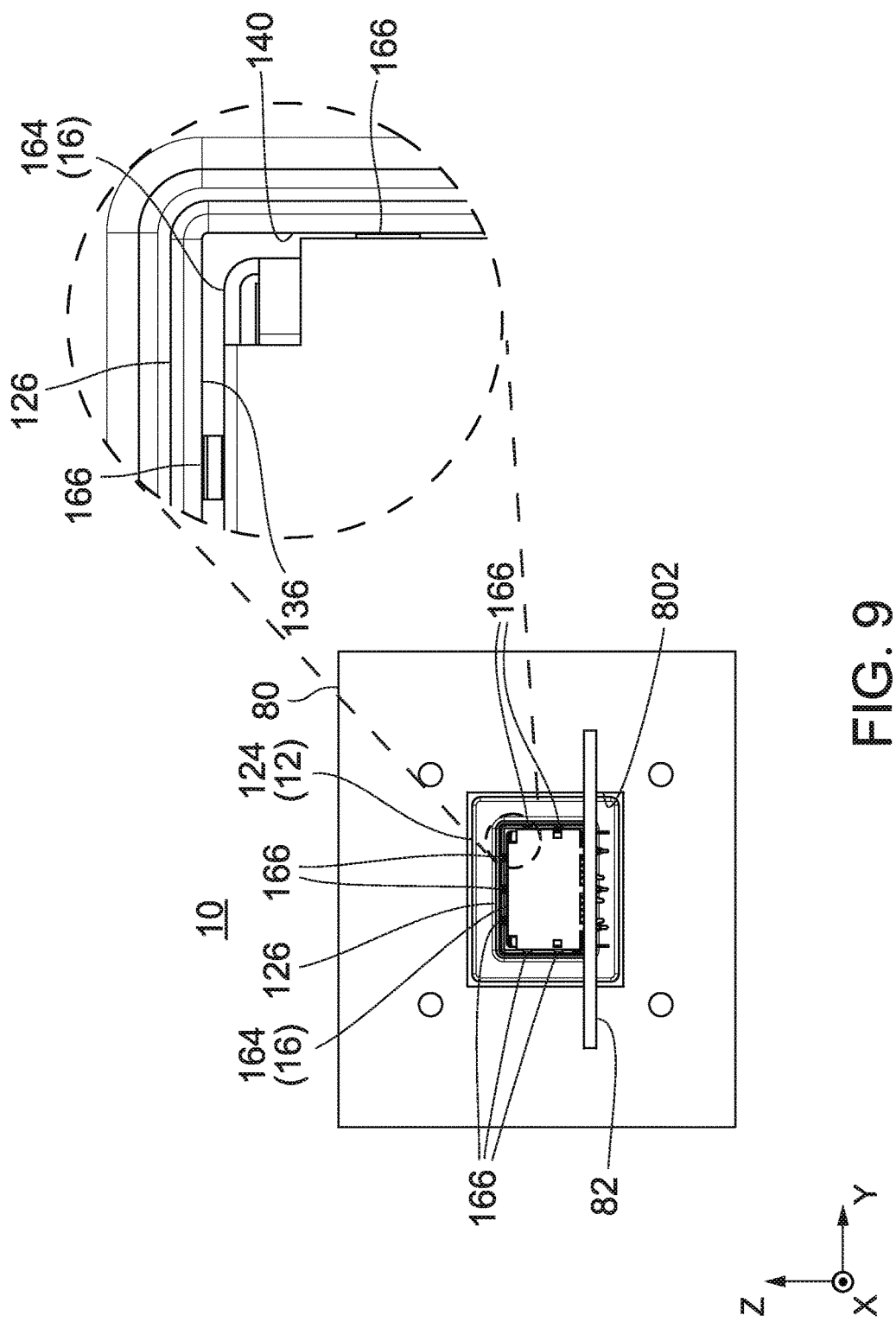
FIG. 9 is a rear view showing the connector of FIG. 5. A part of the connector is enlarged to be depicted.

As understood from FIGS. 6, 8 and 9, the cage 164 has a front end portion to which a plurality of resilient pieces 166 are provided. The resilient pieces 166 are also referred to as a contact portion in this embodiment. The resilient pieces 166 are formed by cutting, raising and bending a part of the metal sheet forming the cage 164. The resilient pieces 166 are in contact with the inner surface of the second-rectangular-tubular portion 126 and connect the cage 164 with the receptacle 12 electrically. In the present embodiment, two or more of the resilient pieces 166 are provided on each of an upper surface, a lower surface and side surfaces of the cage 164. However, the present invention is not limited thereto. It is enough that at least one resilient piece 166 is formed on any one of the upper, the lower and the side surfaces of the cage 164. Nevertheless, in order to stabilize the contact to the second-rectangular-tubular portion 126 of the receptacle 12, it is preferable that the resilient pieces 166 are provided to be in contact with two surfaces facing each other, i.e. the upper surface 136 and the lower surface 138 or the pair of the side surfaces 140 of the second-rectangular-tubular portion 126. It is more preferable that the resilient pieces 166 are provided to be in contact with all surfaces of two sets, i.e. the upper surface 136, the lower surface 138 and the pair of the side surfaces 140.

Figure 5:
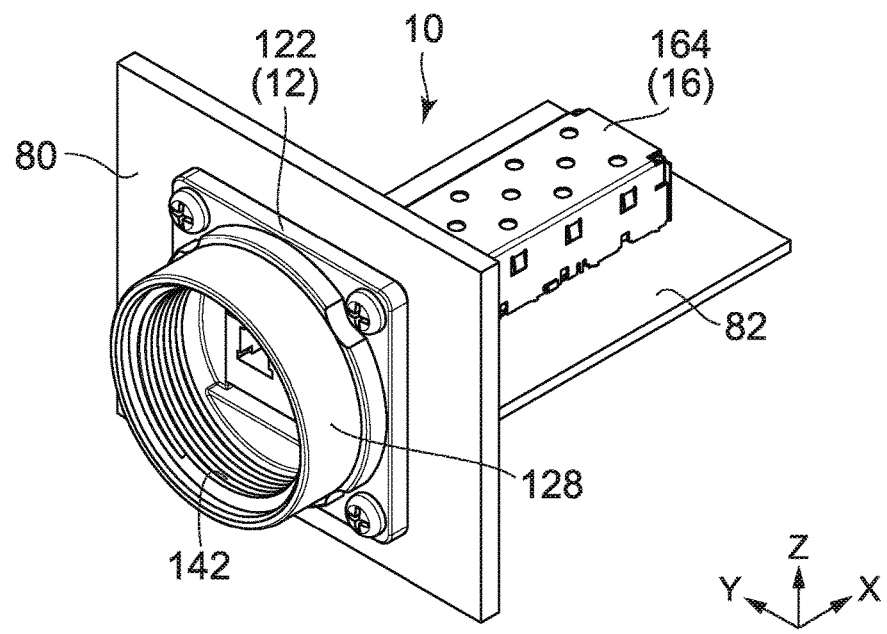
FIG. 5 is a perspective view showing the connector included in the connector assembly of FIG. 1. The receptacle of the connector is attached to the case while the adapter of the connector is mounted on the circuit board. The case is depicted in part.
Figure 7:
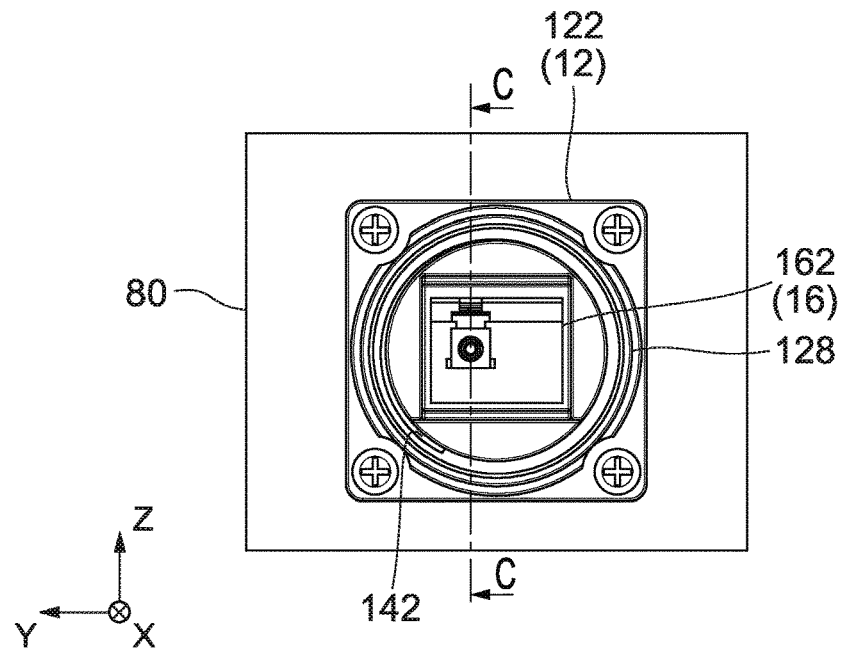
FIG. 7 is a front view showing the connector of FIG. 5.

As mentioned above, in the present embodiment, the receptacle 12 is attached to the case 80, and the adapter 16 is mounted on the circuit board 82 located inside the case 80. Therefore, the degree of freedom about attaching the connector 10 to the case 80 is increased in the present embodiment. In the present embodiment, one of the receptacle 12 and the cage 164 is provided with the resilient pieces 166 (the contact portion) which are in contact with the remaining one of them. Accordingly, the receptacle 12 and the cage 164 are electrically connected to each other via the resilient pieces 166 without direct fixation between them. Moreover, as shown in FIGS. 5 and 7, the receptacle 12 is screwed on the case 80 and connected to the case 80 electrically. Therefore, the noise from the inner module 162 can be shielded by the cage 164 and the case 80. In the connector 10 according to the present embodiment, a size of the hole 802 formed in the case 80 can be smaller than those of connectors 10A and 10B according to second and third embodiments described later. Accordingly, leakage of the noise from the connector 10 can be more reduced.

Second Embodiment

As understood from FIGS. 15 to 20, the connector 10A according to the second embodiment of the present invention is a receptacle connector which is mateable with and removable from a mating connector 50A or a plug connector along a mating direction. The mating connector 50A is different from the mating connector 50 (see FIG. 1) in structure. In this connection, the connector 10A is different from the connector 10 (see FIG. 1) according to the first embodiment in structure. Hereinafter, the description will be made about the difference between the connector 10A and the connector 10 mainly. In the following description, components of the connector 10A which are same as those of the connector 10 are denoted by the same reference signs, and their description is omitted.

As shown in FIGS. 21 to 26, the connector 10A is provided with a receptacle 12A and an adapter 16. The receptacle 12A is provided with a pair of arm portions 210. The arm portions 210 are also referred to as a contact portion in this embodiment. The receptacle 12A is attached to a case 80A of a device (not shown) from the outside or the negative X-direction of the case 80A. The arm portions 210 provided to the receptacle 12A extend inside the case 80A or in the positive X-direction from the inside of a hole 802A formed in the case 80A. The adapter 16 is mounted on a circuit board 82 located inside the case 80A. The cage 164 is located inside the case 80A or in the positive X-direction of the case 80A. A part of the inner module 162 is located inside the hole 802A of the case 80A.

Figure 27:
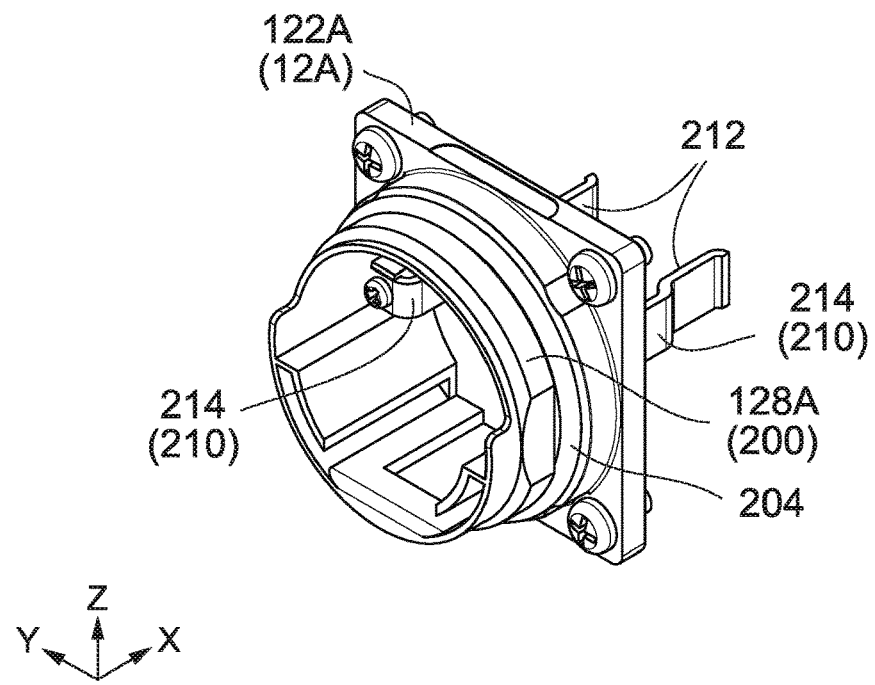
FIG. 27 is a perspective view showing the receptacle of the connector of FIG. 21.
Figure 28:
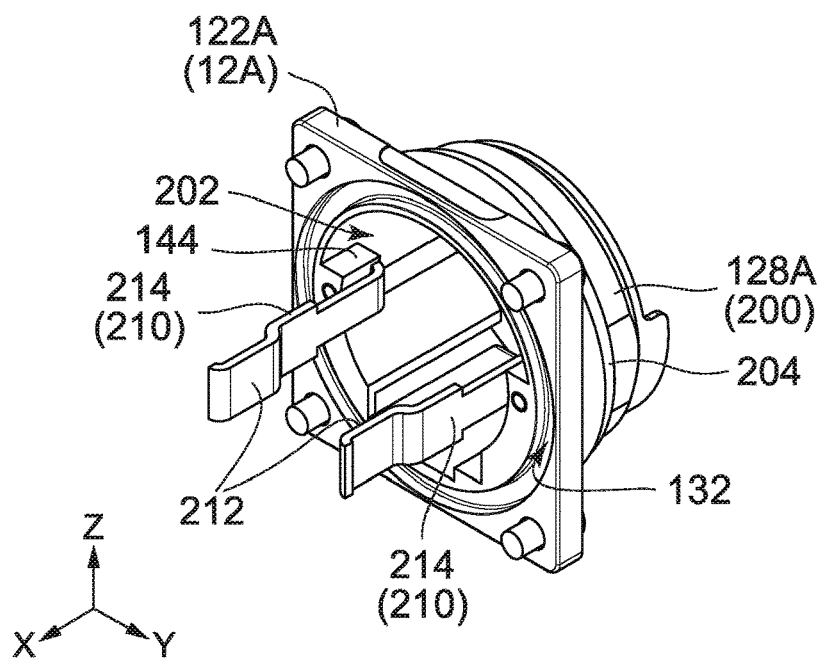
FIG. 28 is another perspective view showing the receptacle of FIG. 27.
Figure 29:
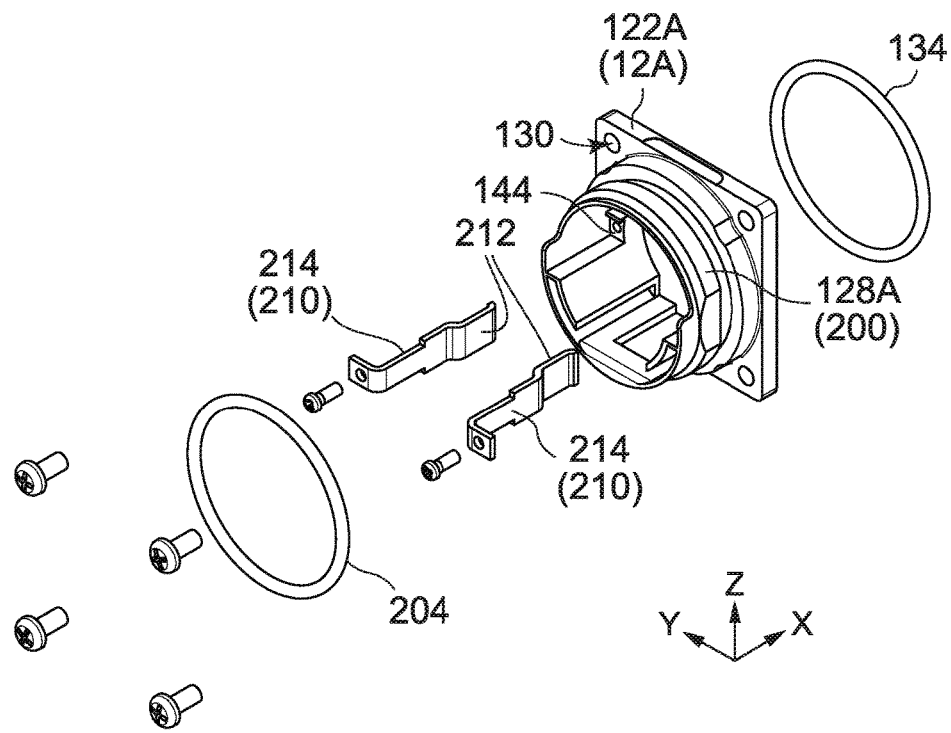
FIG. 29 is an exploded perspective view showing the receptacle of FIG. 27.

As shown in FIGS. 27 to 29, the receptacle 12A has a receptacle main body 200 and a pair of the arm portions 210 screwed on the receptacle main body 200. The receptacle 12A does not have portions corresponding to the first-rectangular-tubular portion 124 and the second-rectangular-tubular portion 126 of the first embodiment (see FIG. 11). Accordingly, it is possible to reduce the connector 10A in size or save a space for the part of connector 10A located inside the case 80A or in the positive X-direction of the case 80A. Each of the receptacle main body 200 and the arm portions 210 is made of metal. When the receptacle main body 200 is attached to the case 80A (see FIG. 25), the arm portions 210 are electrically connected to the case 80A via the receptacle main body 200. The receptacle main body 200 has a flange portion 122A and a cylindrical portion 128A. The flange portion 122A is a plate-like portion of a rectangle shape. The flange portion 122A is formed, at four corner portions thereof, with screw holes 130 penetrating the flange portion 122A in the front-rear direction. The flange portion 122A is formed, in a rear surface thereof, with a groove 132 for a waterproof member so that an opening portion 202 of the receptacle main body 200 is surrounded.

Figure 21:
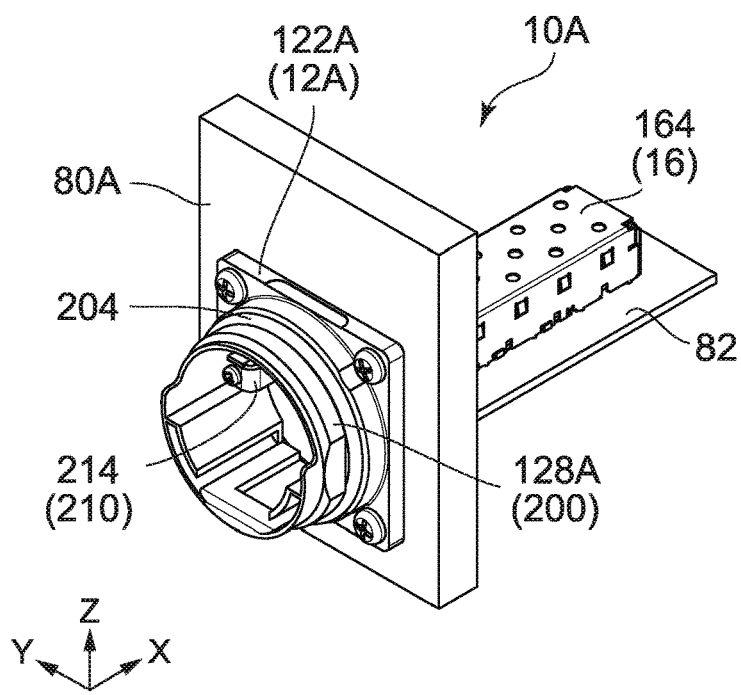
FIG. 21 is a perspective view showing the connector included in the connector assembly of FIG. 15. The receptacle of the connector is attached to the case while the adapter of the connector is mounted on the circuit board. The case is depicted in part.
Figure 23:
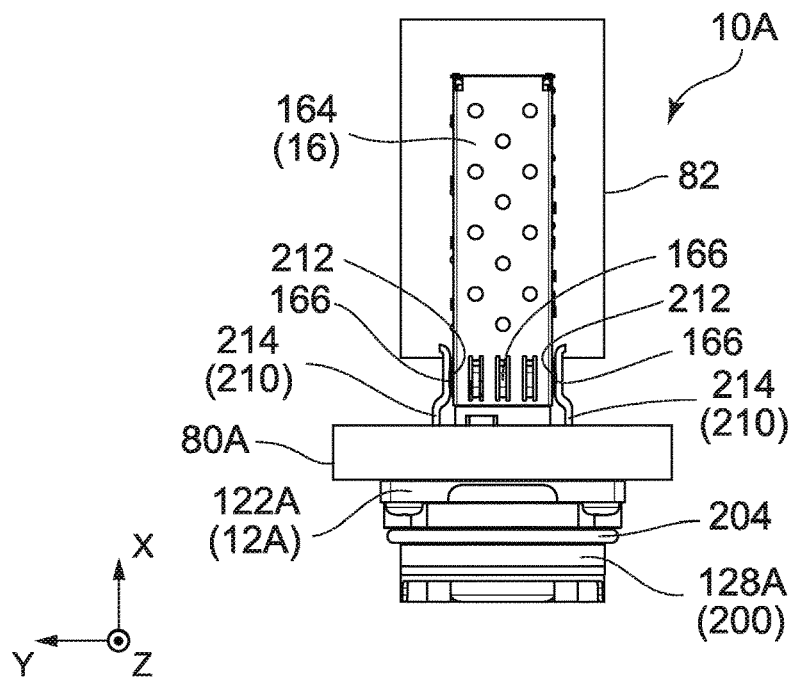
FIG. 23 is a plan view showing the connector of FIG. 21.
Figure 24:
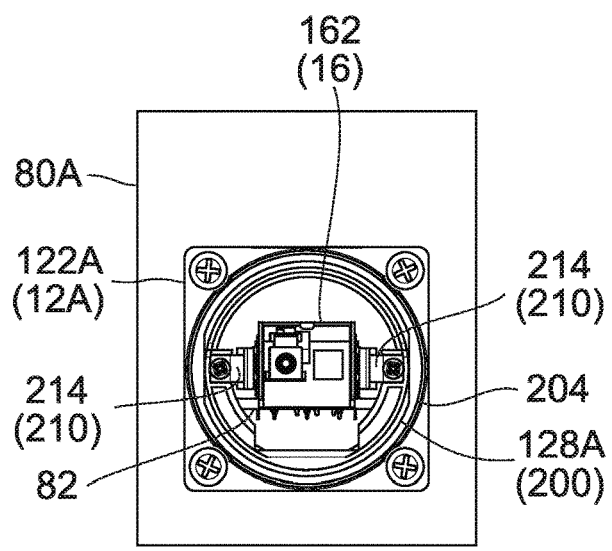
FIG. 24 is a front view showing the connector of FIG. 21.
Figure 25:
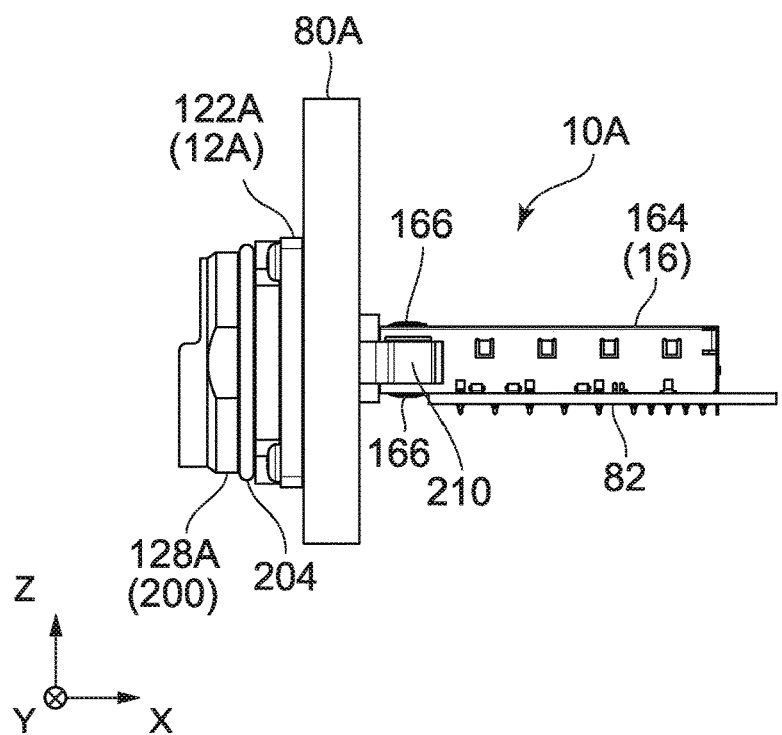
FIG. 25 is a right side view showing the connector of FIG. 21.
Figure 26:
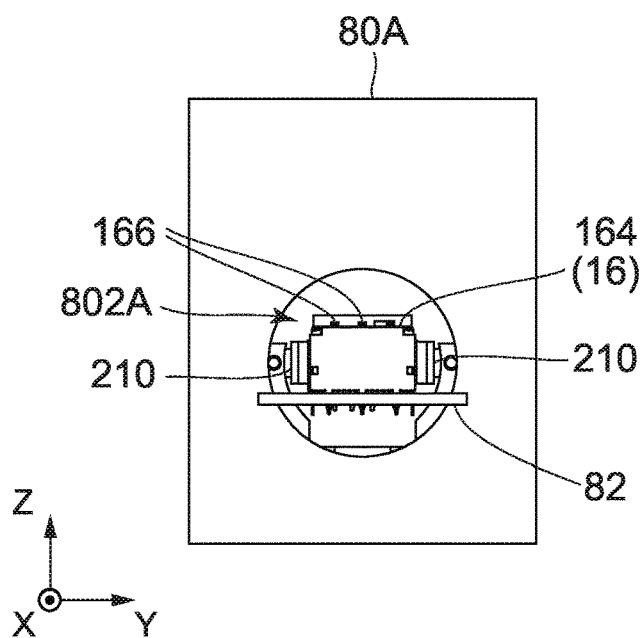
FIG. 26 is a rear view showing the connector of FIG. 21.

As shown in FIGS. 27 to 29, the cylindrical portion 128A protrudes forward from the flange portion 122A. As shown in FIGS. 21, 23 and 25, when the receptacle 12A is attached to the case 80A, the cylindrical portion 128A extends outside the case 80A or in the negative X-direction from the flange portion 122A along the mating direction. The flange portion 122A is attached with a waterproof member 204. The waterproof member 204 seals a gap between the connector 10A and the mating connector 50A when the connector 10A and the mating connector 50A are mated with each other (see FIG. 20).

Figure 22:
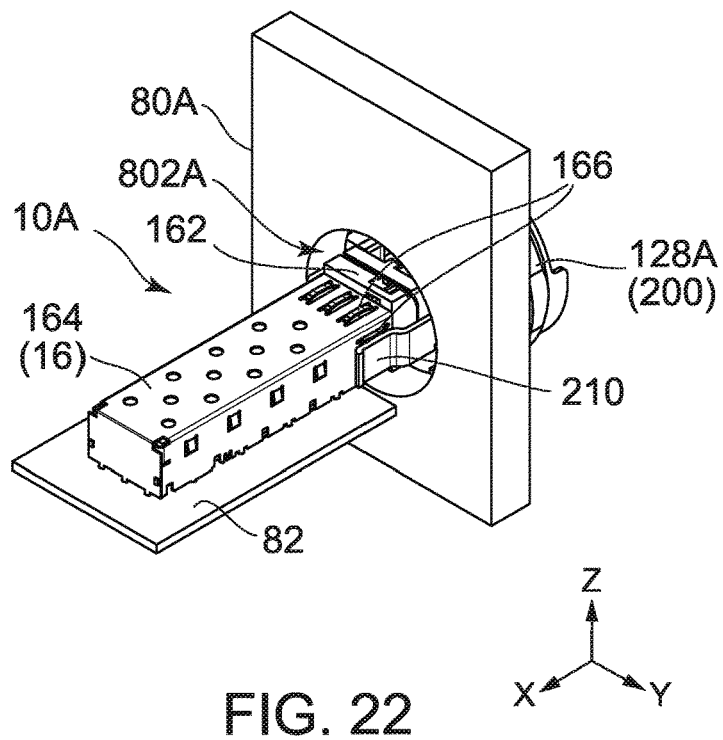
FIG. 22 is another perspective view showing the connector of FIG. 21.

As understood from FIG. 29, the arm portions 210 of the pair have the same structure. In detail, each of the arm portions 210 is formed by bending a metal sheet having a predetermined shape. Each of the arm portions 210 has a contact point 212 or a contact surface and a supporting portion 214 supporting the contact point 212. The supporting portion 214 has resilience. The supporting portion 214 has two ends, i.e. a fixed end and a free end. The fixed end of the supporting portion 214 is screwed on a fixing portion 144 provided to the flange portion 122A. However, the present invention is not limited thereto. The arm portions 210 may be fixed to the receptacle main body 200 by another method, such as adhesion, welding, press-fitting or the like. The free end of the supporting portion 214 is movable at least in the lateral direction. The contact point 212 is located away from the fixed end of the supporting portion 214. Preferably, the contact point 212 is located near the free end of the supporting portion 214. The contact point 212 is supported by the supporting portion 214 so as to be movable at least in the lateral direction due to resilient deformation of the supporting portion 214. Although the arm portions 210 are not limited in shape particularly, they are formed so that the contact points 212 of them face inward in the lateral direction. Referring to FIG. 22 together, the contact points 212 forming a pair have an interval therebetween smaller than a width of the adapter 16 in the lateral direction. Upon putting the adapter 16 between the contact points 212 of the pair, the arm portions 210 sandwich the adapter 16 while the contact points 212 are pressed against the adapter 16 by reaction forces of the supporting portions 214. Thus, the arm portions 210 serve as the contact portion which is in contact with the cage 164 in the present embodiment. As a result, the cage 164 of the adapter 16 and the receptacle 12A are electrically connected to each other with the arm portions 210. In the present embodiment, the arm portions 210 of the pair have the same structure and resilience as each other. However, it is enough that one of the arm portions 210 has resilience. In addition, the arm portions 210 of the pair are arranged in the lateral direction in the present embodiment. However, the arm portions 210 may be arrange in the up-down direction. Alternatively, under the state that the arm portions 210 of the pair are arranged in the lateral direction, another pair of arm portions may be further arranged in the up-down direction. Furthermore, in the present embodiment, the front end portion of the cage 164 is provided with the resilient pieces 166 formed by cutting, raising and bending at the upper surface, the lower surface and the side surfaces thereof. However, the present invention is not limited thereto. The cage 164 may not have the resilient pieces 166. In other words, the upper surface, the lower surface and the side surfaces of the cage 164 may be flat surfaces. The arm portions 210 can be in contact with the cage 164 due to the resilience of the supporting portions 214 regardless of the presence or absence of the resilient pieces 166.

As mentioned above, the receptacle 12A is attached to the case 80A while the adapter 16 is mounted on the circuit board 82 located inside the case 80A also in the present embodiment. Therefore, the degree of freedom about attaching the connector 10A to the case 80A is also increased in the present embodiment. In the present embodiment, one of the receptacle 12A and the cage 164 is provided with the arm portions 210 (the contact portion) which are in contact with the remaining one of them. Accordingly, the receptacle 12A and the cage 164 are electrically connected to each other via the arm portions 210 without direct fixation between them. Moreover, as understood from FIGS. 21 and 23 to 25, the receptacle 12A is screwed on the case 80A and connected to the case 80A electrically. Therefore, the noise from the inner module 162 can be shielded by the cage 164 and the case 80A. In the present embodiment, the arm portions 210 serving as the contact portion are resiliently deformable. Accordingly, an electrical connection between the cage 164 and the receptacle 12A is certainly achieved even when a positional difference between the receptacle 12A and the cage 164 is larger than that of the first embodiment.

Third Embodiment

Figure 30:
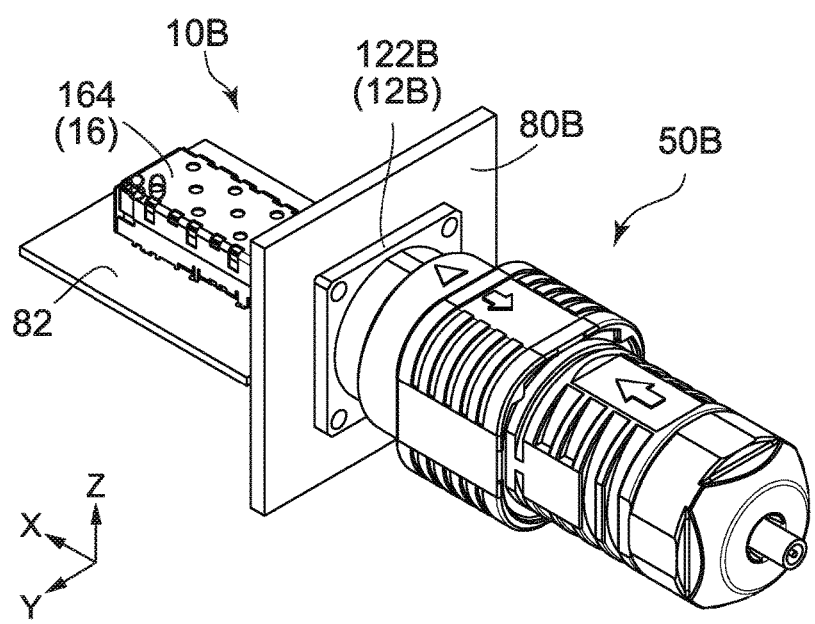
FIG. 30 is a perspective view showing a connector assembly including a connector according to a third embodiment of the present invention. The connector and a mating connector are in a mated state. A receptacle of the connector is attached to a case while an adapter of the connector is mounted on a circuit board. The case is depicted in part.
Figure 31:
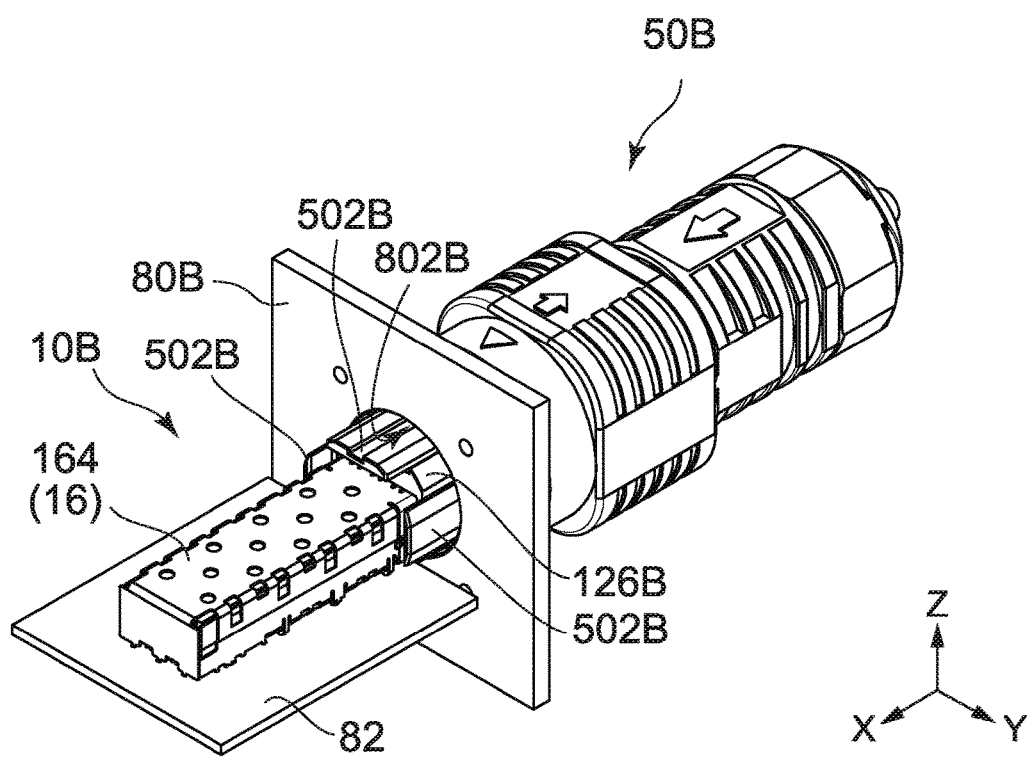
FIG. 31 is another perspective view showing the connector assembly of FIG. 30.
Figure 32:
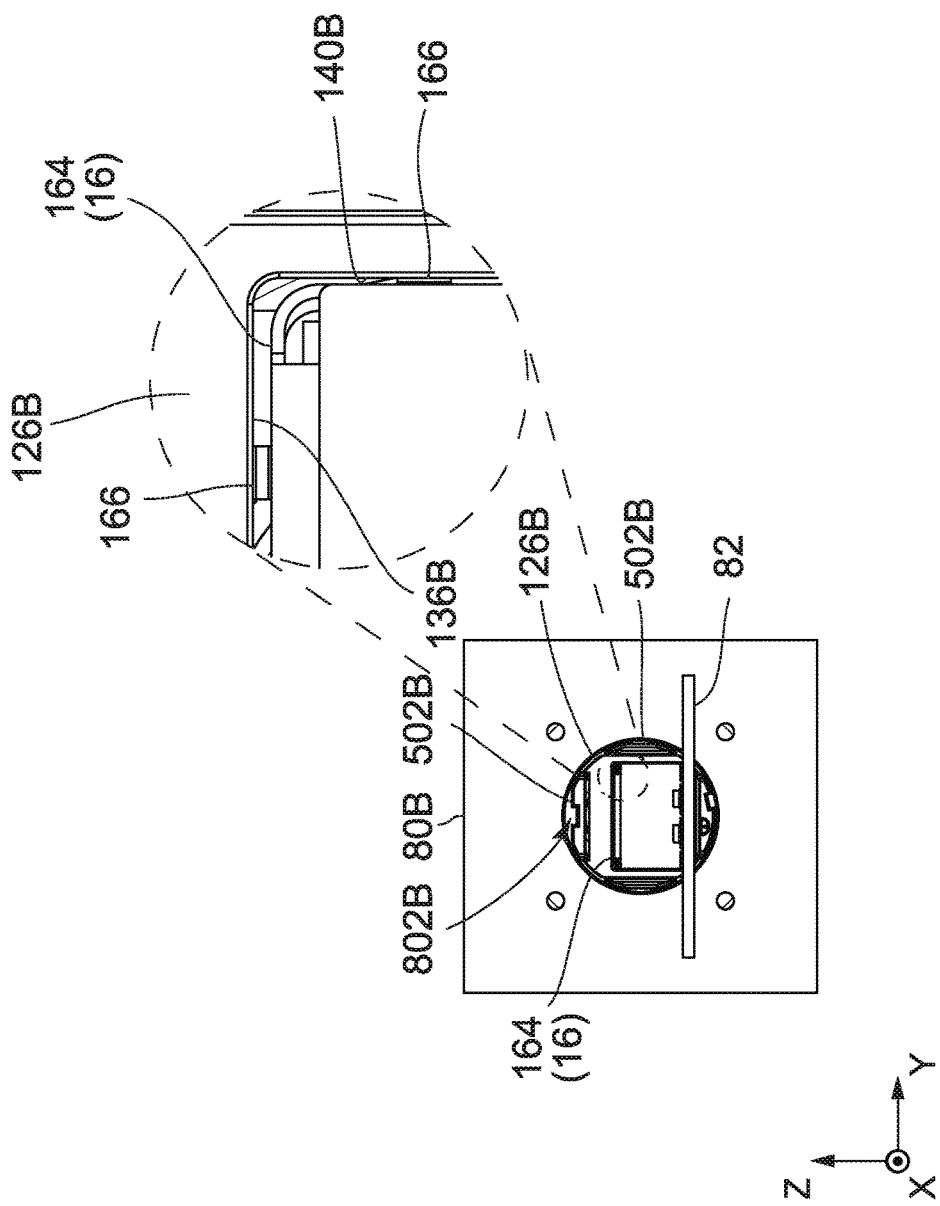
FIG. 32 is a rear view showing the connector assembly of FIG. 31. A part of the connector assembly is enlarged to be depicted.

As understood from FIGS. 30 to 32, the connector 10B according to the third embodiment of the present invention is receptacle connector which is mateable with and removable from a mating connector 50B or a plug connector along a mating direction. The mating connector 50B is different from the mating connector 50 (see FIG. 1) in structure. In this connection, the connector 10B is also different from the connector 10 (see FIG. 1) according to the first embodiment in structure. Hereinafter, the description will be made about the difference between the connector 10B and the connector 10 mainly. In the following description, components of the connector 10B which are same as those of the connector 10 are denoted by the same reference signs, and their description is omitted.

As understood from FIGS. 30 and 31, the connector 10B is provided with a receptacle 12B and an adapter 16. The receptacle 12B is attached to a case 80B of a device (not shown) from the outside or the negative X-direction of the case 80B. A part of the receptacle 12B is inserted into a hole 802B formed in the case 80B and protrudes inside the case 80B or in the positive X-direction. The adapter 16 is mounted on a circuit board 82 located inside the case 80B. The cage 164 is located inside the case 80B or in the positive X-direction of the case 80B.

As shown in FIGS. 33 to 37, the receptacle 12B has a flange portion 122B, a rectangular tubular portion (tubular portion) 126B and a cylindrical portion 128B. The receptacle 12B is made of metal. The receptacle 12B is electrically connected to the case 80B when it is attached to the case 80B (see FIG. 30). As understood from FIGS. 33 to 37, the flange portion 122B is a plate-like portion of a rectangle shape. The flange portion 122B is formed, at four corner portions thereof, with screw holes 130 penetrating the flange portion 122B in the front-rear direction. As shown in FIGS. 33 and 35 to 37, the flange portion 122B is formed, in a rear surface or an attaching surface thereof, with a groove 132 for a waterproof member.

Figure 33:
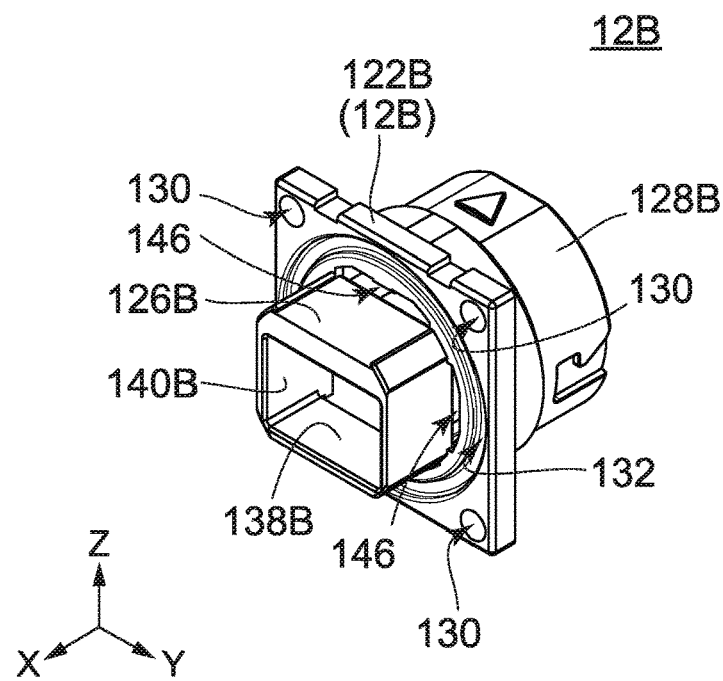
FIG. 33 is a perspective view showing a receptacle of the connector included in the connector assembly of FIG. 30.
Figure 34:
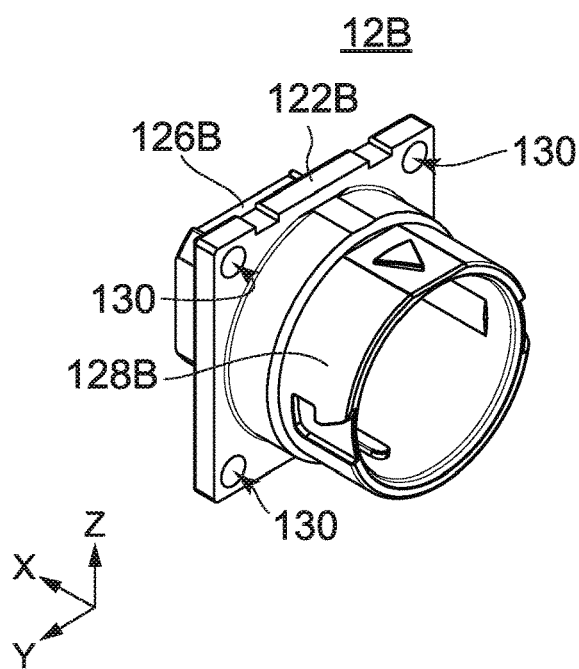
FIG. 34 is another perspective view showing the receptacle of FIG. 33.
Figure 37:
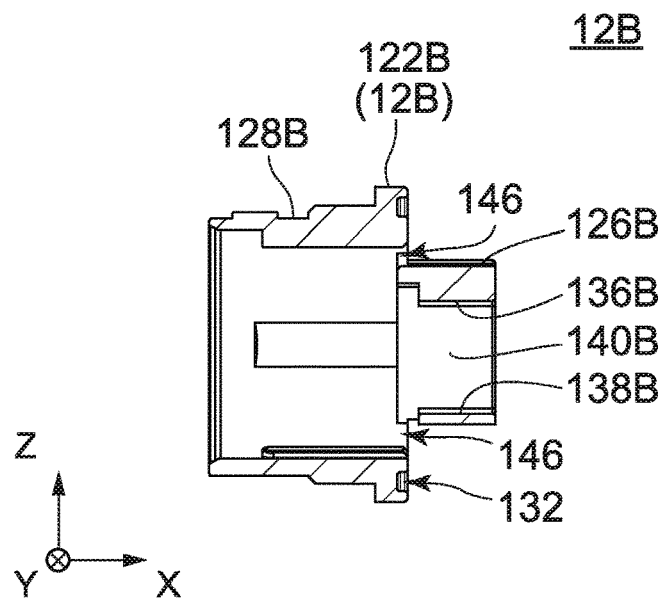
FIG. 37 is a cross-sectional view showing the receptacle of FIG. 36, taken along line F-F.

As shown in FIGS. 33, 34 and 37, the rectangular tubular portion 126B protrudes rearward from the flange portion 122B in the front-rear direction. The rectangular tubular portion 126B extends rearward beyond the rear surface or the attaching surface of the flange portion 122B in the front-rear direction. This means that the rectangular tubular portion 126B extends rearward beyond a front end of the cage 164 (see FIG. 31). Accordingly, the rectangular tubular portion 126B can surround a part of the inner module 162 that protrudes forward from the cage 164. On the other hand, the cylindrical portion 128B protrudes forward from the flange portion 122B in the front-rear direction. When the receptacle 12B is attached to the case 80B (see FIGS. 31 and 32), the rectangular tubular portion 126B extends inside the case 80B or in the positive X-direction of the case 80 from the flange portion 122B along the mating direction. At this time, the cylindrical portion 128B extends outside the case 80B or in the negative X-direction of the case 80 from the flange portion 122B along the mating direction.

Figure 35:
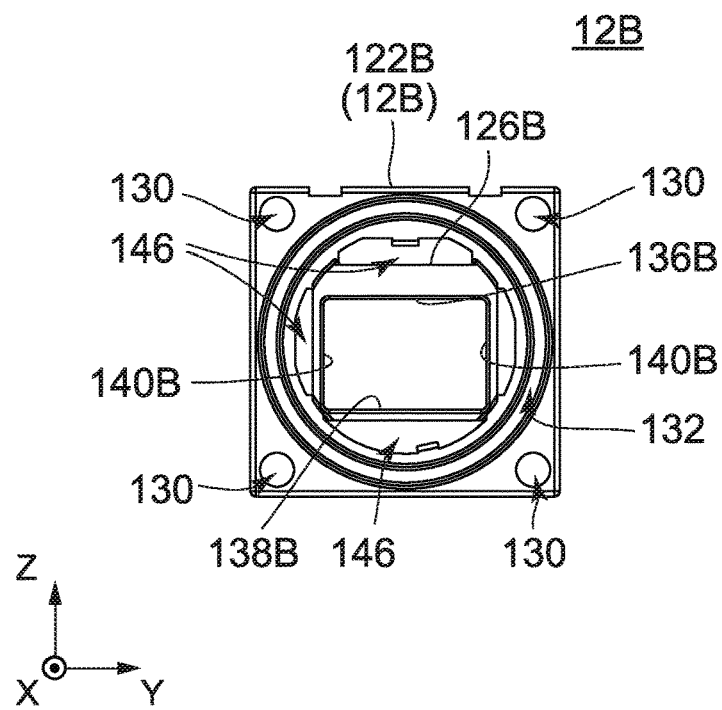
FIG. 35 is a rear view showing the receptacle of FIG. 33.
Figure 36:
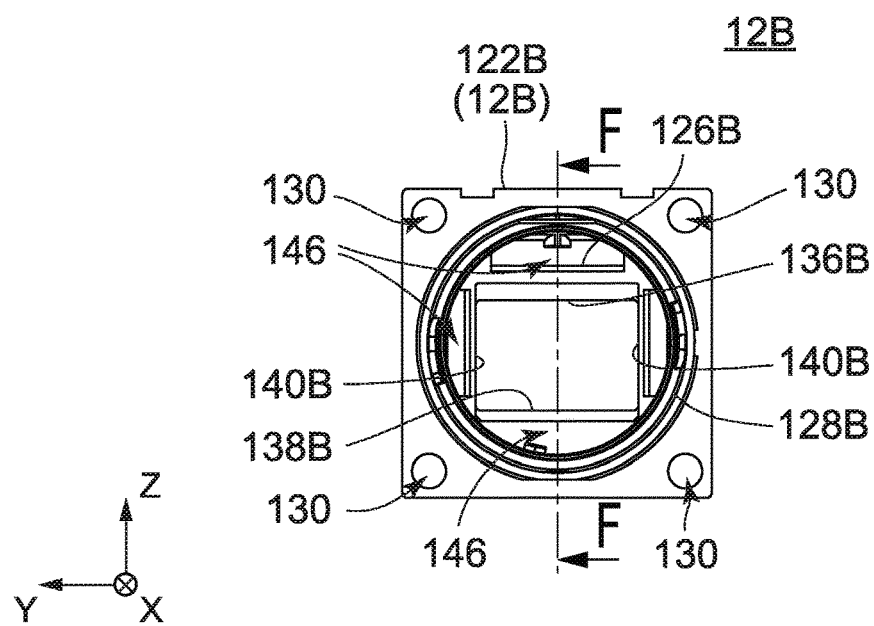
FIG. 36 is a front view showing the receptacle of FIG. 33.

As shown in FIG. 35, when seen along the mating direction, the rectangular tubular portion 126B has an outer shape and an inner shape both of which are approximately rectangular. However, the present invention is not limited thereto. Provided that the inner shape of the rectangular tubular portion 126B corresponds to an outer shape of the adapter 16 (see FIG. 31), each of the outer shape and the inner shape of the rectangular tubular portion 126B may be another shape, such as a polygon, an ellipse or a circle. When seen along the mating direction, as shown in FIG. 36, the inner shape of the rectangular tubular portion 126B is smaller than an inner shape of the cylindrical portion 128B. Accordingly, it is possible to avoid enlarging the rectangular tubular portion 126B and eventually enlarging the receptacle 12B.

As understood from FIGS. 33 and 35 to 37, when seen along the mating direction, four holes 146 are formed between the cylindrical portion 128B and the rectangular tubular portion 126B along edges of the rectangular tubular portion 126B. However, the present invention is not limited thereto. It is enough that at least one hole 146 is formed in a periphery of the rectangular tubular portion 126B. The holes 146 open in the rear surface or the attaching surface of the flange portion 122B and communicate with an inner space of the cylindrical portion 128B.

As understood from FIGS. 33 and 35 to 37, the rectangular tubular portion 126B has, as an inner surface, two sets each of which has two flat surfaces facing each other. In detail, the inner surface of the rectangular tubular portion 126B has an upper surface 136B, a lower surface 138B and a pair of side surfaces 140B. The upper surface 136B and the lower surface 138B face each other in an up-down direction. The side surfaces 140 face each other in a lateral direction.

As shown in FIG. 32, in the present embodiment, the resilient pieces 166 of the cage 164 are in contact with the inner surface of the rectangular tubular portion 126B of the receptacle 12B and connect the cage 164 with the receptacle 12B electrically.

Figure 38:
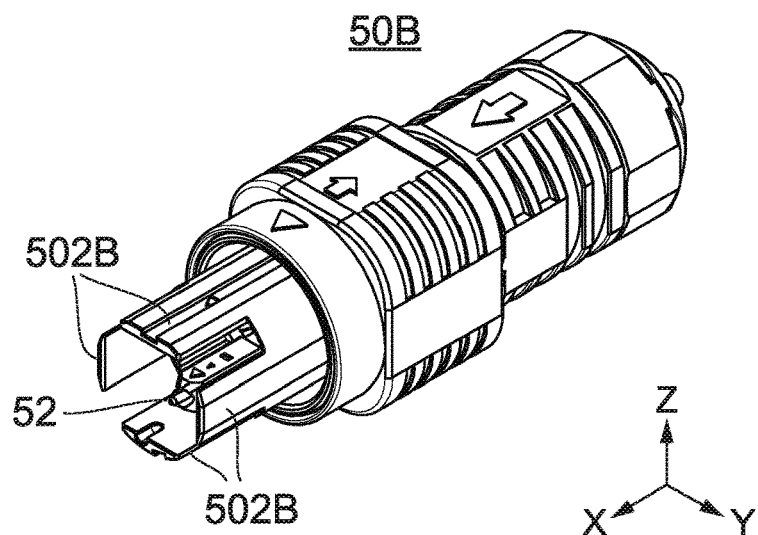
FIG. 38 is a perspective view showing the mating connector included in the connector assembly of FIG. 31.
Figure 39:
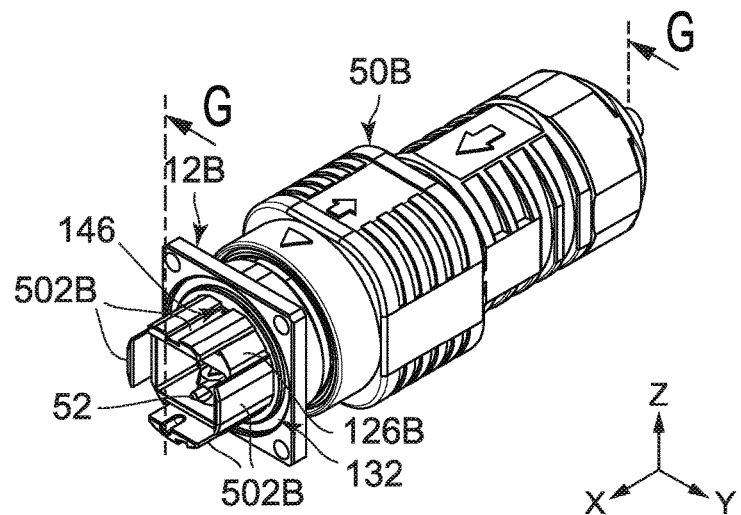
FIG. 39 is a perspective view showing a combination of the mating connector of FIG. 38 and the receptacle of FIG. 33. The receptacle is in a position where it is positioned when the connector and the mating connector are in the mated state.
Figure 40:
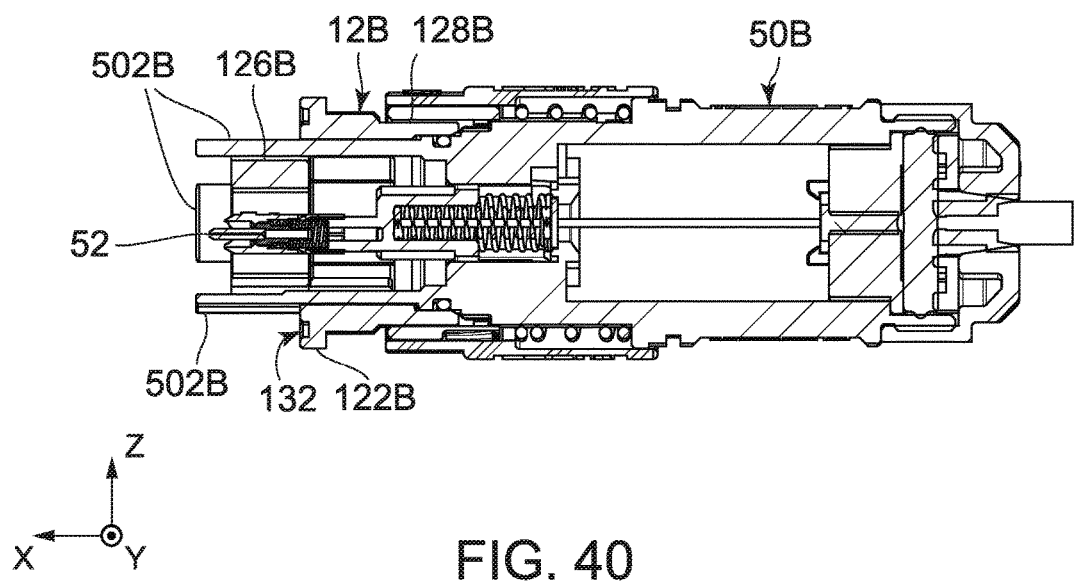
FIG. 40 is a cross-sectional view showing the combination of the mating connector and the receptacle of FIG. 39, take along line G-G.
Figure 41:
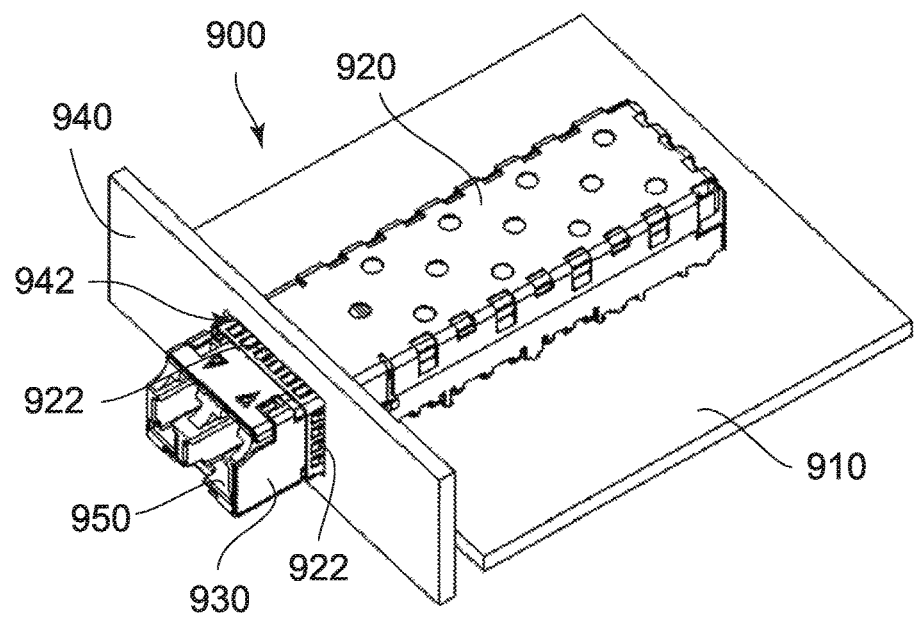
FIG. 41 is a perspective view showing a connector described in Patent Document 1.
Figure 42:
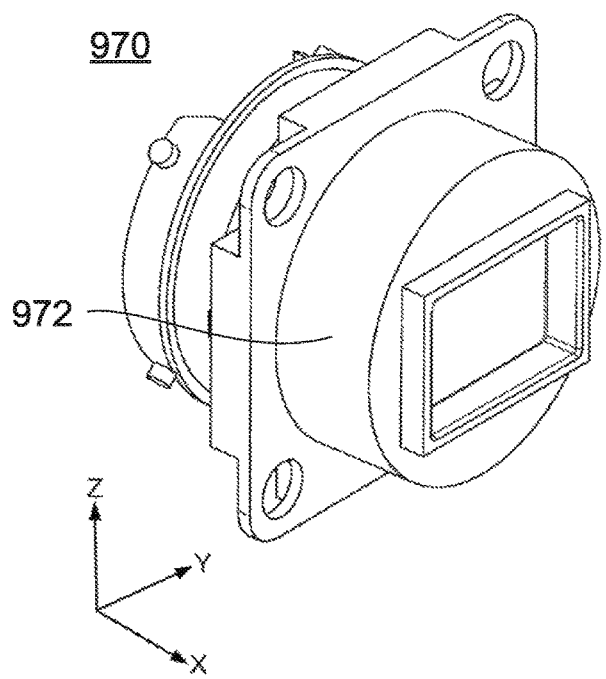
FIG. 42 is a perspective view showing a mating enclosure assembly described in Patent Document 2.

As shown in FIG. 38, the mating connector 50B has four guide protruding portions 502B. The guide protruding portions 502B protrude rearward beyond a tip of the optical connector 52 or in the positive X-direction of the tip of the optical connector 52. Therefore, it is possible to prevent the tip of the optical connector 52 from hitting against something in a case, for example, where the mating connector 50B is fallen. As shown in FIGS. 39 and 40, when the mating connector 50B and the receptacle 12B or the connector 10B are in a mated state that they are mated with each other, the guide protruding portions 502B are inserted into the holes 146 of the receptacle 12B. At this time, the guide protruding portions 502B cover a periphery of the rectangular tubular portion 126B partly and contribute to shield a noise. When the mating connector 50B is mated with the receptacle 12B or the connector 10B, ends of the guide protruding portions 502B are inserted into the holes 146. As a result, a rotation of the mating connector 50B with respect to the connector 10B around an axis along the mating direction is regulated. Here, an arrangement of the guide protruding portions 502B may be asymmetric. Alternatively, a shape of at least one of the guide protruding portions 502B may be asymmetric. Asymmetry of the guide protruding portions 502B makes it possible to limit orientation of the mating connector 50B which is in a state that the ends of the guide protruding portions 502B can be inserted into the holes 146. In the present embodiment, three of the guide protruding portions 502B are asymmetric in shape. Consequently, it is possible to prevent wrong mating of the connector 10B and the mating connector 50B from occurring.

As mentioned above, the receptacle 12B is attached to the case 80B while the adapter 16 is mounted on the circuit board 82 located inside the case 80B also in the present embodiment. Therefore, the degree of freedom about attaching the connector 10B to the case 80B is also increased in the present embodiment. In the present embodiment, one of the receptacle 12B and the cage 164 is provided with the resilient pieces 166 which are in contact with the remaining one of them. Accordingly, the receptacle 12B and the cage 164 are electrically connected to each other via the resilient pieces 166 without direct fixation between them. Moreover, as understood from FIG. 30, the receptacle 12B is screwed on the case 80B and electrically connected to the case 80B. Therefore, the noise from the inner module 162 can be shielded by the cage 164 and the case 80B. In the present embodiment, the rectangular tubular portion 126B extends rearward beyond the rear surface of the flange portion 122B to cover a part of the inner module 162. Therefore, it is possible to more reduce leakage of the noise from the inner module 162.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, in the aforementioned embodiments, each of the receptacles 12, 12A and 12B, the cage 164 and the contact portion, i.e. the resilient pieces 166 or the arm portions 210, is made of metal. However, each of a part or all of them may be made of insulating resin and a conductive film formed on a surface thereof. Moreover, in the aforementioned embodiments, each of the receptacles 12, 12A and 12B is attached to the case 80, 80A or 80B. However, each of the receptacles 12, 12A and 12B may be attached to a component forming the case 80, 80A or 80B, such as a front panel or the like.

What is claimed is:

1. A connector which is mateable with and removable from a mating connector along a mating direction, the mating connector having an optical connector, and the connector comprising:
   a receptacle to be attached to a case; and
   an adapter to be mounted on a circuit board located in the case;
   wherein:
   the adapter has an inner module to be connected to the optical connector and a cage which accommodates the inner module at least in part;
   one of the receptacle and the cage is provided with a contact portion which is in contact with a remaining one of the receptacle and the cage without being in contact with the case; and
   the receptacle and the cage are electrically connected to each other through the contact portion without direct fixation between the receptacle and the cage.

2. The connector as recited in claim 1, wherein:
   the receptacle has a first tubular portion extending along the mating direction and a second tubular portion extending inward of the case from the first tubular portion;
   the first tubular portion has a first outer shape and a first inner shape;
   the second tubular portion has a second outer shape and a second inner shape;
   the second outer shape and the second inner shape are smaller than the first outer shape and the first inner shape, respectively, when seen along the mating direction;
   the contact portion comprises at least one resilient piece provided to the cage;
   the second tubular portion has an inner surface; and
   the at least one resilient piece is in contact with the inner surface of the second tubular portion.

3. The connector as recited in claim 2, wherein:
   the first outer shape, the first inner shape, the second outer shape, and the second inner shape are approximately rectangular when seen along the mating direction;
   the inner surface of the second tubular portion comprises two sets each of which has two flat surfaces facing each other;
   the at least one resilient piece comprises a plurality of resilient pieces; and
   the resilient pieces are arranged so as to be in contact with both of the flat surfaces of at least one of the two sets.

4. The connector as recited in claim 1, wherein:
   the receptacle is provided with a pair of arm portions as the contact portion;
   the arm portions extend inward of the case;
   at least one of the arm portions has resilience; and
   the arm portions sandwich the cage.

5. The connector as recited in claim 1, wherein:
   the receptacle has a tubular portion extending inward of the case along the mating direction;
   the contact portion comprises at least one resilient piece provided to the cage;
   the tubular portion has an inner surface;
   the at least one resilient piece is in contact with the inner surface of the tubular portion; and
   when seen along the mating direction, the receptacle is provided with at least one hole which penetrates the receptacle in the mating direction and is located on a periphery of the tubular portion.

6. The connector as recited in claim 5, wherein:
   the tubular portion has an outer shape and an inner shape which are approximately rectangular when seen along the mating direction;
   the inner surface of the tubular portion has two sets each of which has two flat surfaces facing each other;
   the at least one resilient piece comprises a plurality of resilient pieces; and
   the resilient pieces are arranged so as to be in contact with both of the flat surfaces of at least one of the two sets.

7. The connector as recited in claim 1, wherein each of the receptacle, the cage, and the contact portion is made of metal.

8. The connector as recited in claim 1, wherein at least one of the receptacle, the cage, and the contact portion comprises an insulating resin having a surface and a conductive film formed on the surface of the insulating resin.

\* \* \* \* \*